(12) United States Patent
Nelson et al.

(10) Patent No.: US 11,873,762 B2
(45) Date of Patent: Jan. 16, 2024

(54) HIGH TEMPERATURE HEAT SHIELD ASSEMBLIES

(71) Applicant: Rolls-Royce Corporation, Indianapolis, IN (US)

(72) Inventors: Scott Nelson, Carmel, IN (US); Quinlan Y. Shuck, Indianapolis, IN (US); Ted J. Freeman, Danville, IN (US); Timothy Fuesting, Thorntown, IN (US); Jonathan McCrory, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 79 days.

(21) Appl. No.: 17/317,357

(22) Filed: May 11, 2021

(65) Prior Publication Data

US 2021/0388767 A1    Dec. 16, 2021

Related U.S. Application Data

(60) Provisional application No. 63/039,657, filed on Jun. 16, 2020.

(51) Int. Cl.
*F02C 7/24* (2006.01)
*F01D 25/14* (2006.01)

(52) U.S. Cl.
CPC .............. *F02C 7/24* (2013.01); *F01D 25/145* (2013.01); *F05D 2220/323* (2013.01); *F05D 2240/15* (2013.01)

(58) Field of Classification Search
CPC .......... F01D 25/08; F01D 25/145; F02C 7/24; F02K 1/822
See application file for complete search history.

(56) References Cited

U.S. PATENT DOCUMENTS

| | | |
|---|---|---|
| 3,504,470 A | 4/1970 | Pincemin |
| 4,675,223 A | 6/1987 | Trummer |
| 5,236,151 A | 4/1993 | Hagle et al. |
| 5,489,074 A | 2/1996 | Arnold et al. |
| 5,547,628 A | 8/1996 | Lacombe et al. |
| 6,733,235 B2 | 5/2004 | Alford et al. |
| 7,052,235 B2 | 5/2006 | Alford et al. |
| 8,568,054 B2 | 10/2013 | Etling |
| 10,968,764 B2 * | 4/2021 | Vetters ................. F01D 25/005 |
| 2016/0169038 A1 | 6/2016 | Weaver et al. |
| 2018/0106160 A1 | 4/2018 | Thomas et al. |
| 2019/0107001 A1 * | 4/2019 | Crutchfield .......... F01D 25/005 |
| 2021/0025284 A1 * | 1/2021 | Sippel .................. F01D 25/246 |
| 2021/0148244 A1 * | 5/2021 | Freeman ............... F01D 11/08 |
| 2021/0189898 A1 * | 6/2021 | Thomas ................. F01D 9/04 |

\* cited by examiner

*Primary Examiner* — Woody A Lee, Jr.
*Assistant Examiner* — Cameron A Corday
(74) *Attorney, Agent, or Firm* — Barnes & Thornburg LLP

(57) ABSTRACT

A heat shield assembly adapted for use with gas turbine engines, airframes, and aircraft includes a carrier and a heat-shield tile. The carrier is adapted to couple to the gas turbine engine, airframe, or aircraft. The heat-shield tile includes material different than the carrier and is arranged to cover the carrier to protect the carrier from high-temperature gases surrounding the heat shield assembly.

17 Claims, 9 Drawing Sheets

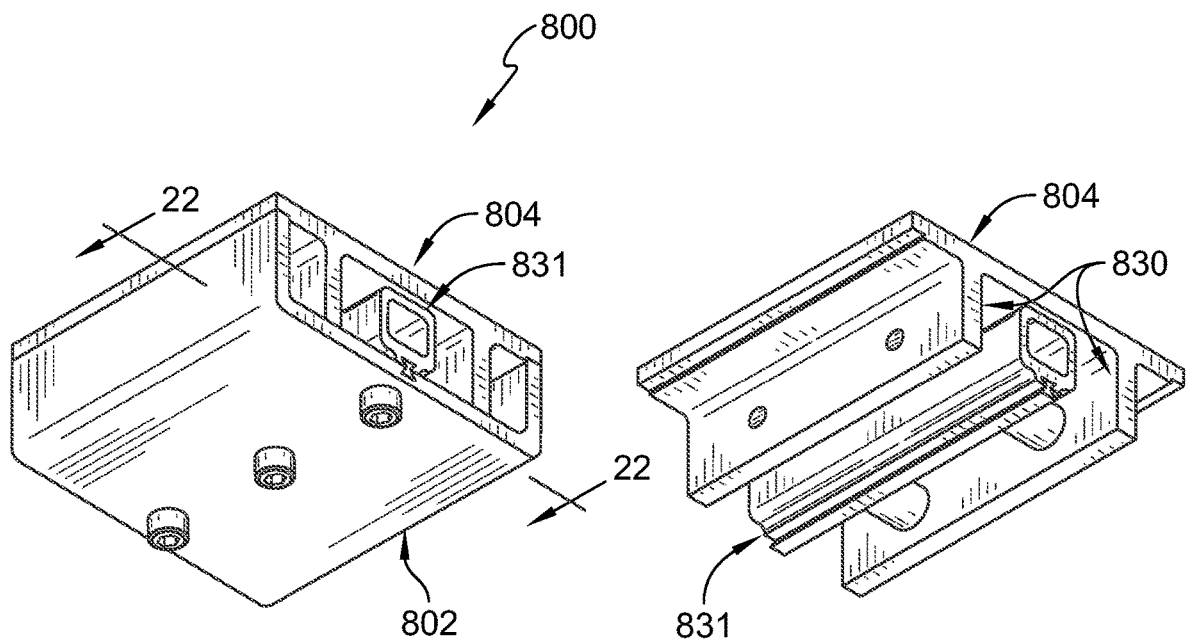
*FIG. 20*  *FIG. 21*
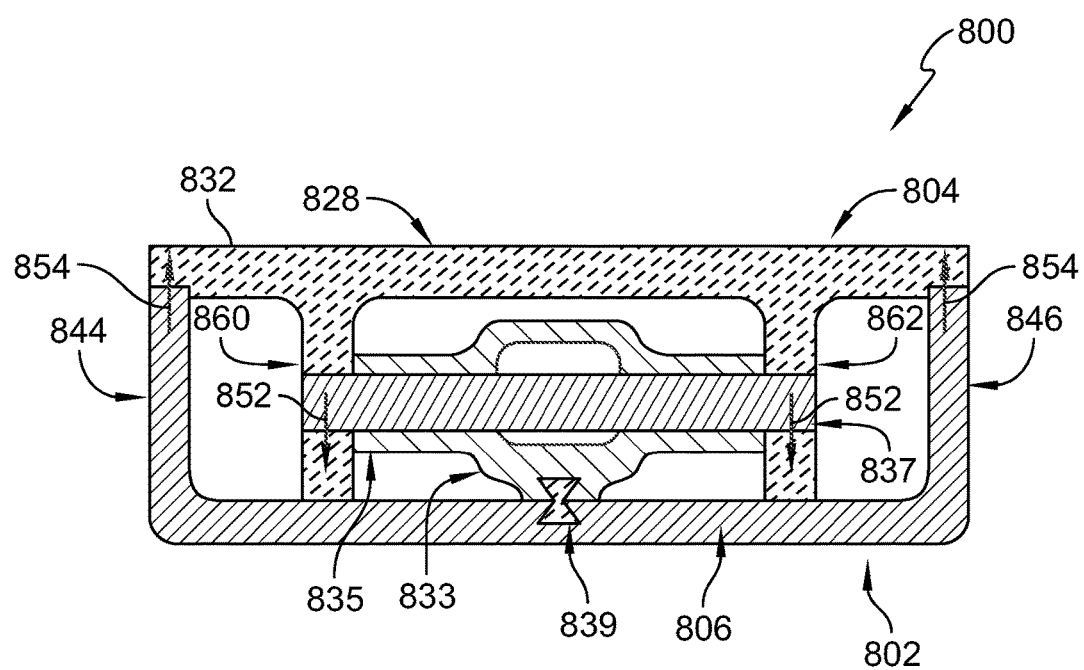
*FIG. 22*

HIGH TEMPERATURE HEAT SHIELD ASSEMBLIES

CROSS REFERENCE TO RELATED APPLICATIONS

This application claims priority to and the benefit of U.S. Provisional Patent Application No. 63/039,657, filed 16 Jun. 2020, the disclosure of which is now expressly incorporated herein by reference.

FIELD OF THE DISCLOSURE

The present disclosure relates generally to aircraft and to gas turbine engines, and more specifically to an aircraft including an airframe or a gas turbine engine adapted to be exposed to high temperatures.

BACKGROUND

Engines, and particularly gas turbine engines, are used to power aircraft, watercraft, power generators and the like. Structures of the aircraft and the gas turbine engine made of metal alloys may be cooled to be maintained at or below their maximum use temperatures. The operational efficiencies of these structures are sometimes increased with the use of other materials that use less cooling and have operating temperatures that exceed the maximum use temperatures of most metal alloys. The reduced cooling used by other materials when compared to metal alloys can permit greater temperature uniformity.

One challenge relating to the use of heat shields is that coupling heat shields to an underlying structure when the heat shield includes materials that are different from the underlying structure. Accordingly, new techniques and configurations are desired for coupling heat shields to the walls of structures experiencing high-temperature environments.

SUMMARY

The present disclosure may comprise one or more of the following features and combinations thereof.

According to one aspect of the present disclosure, a heat shield assembly includes a carrier and a heat-shield tile. The carrier includes metallic material and is adapted to couple to at least one of an airframe and a gas turbine engine. The heat-shield tile includes material different than the carrier and is arranged to cover the carrier to protect the carrier from high-temperature air surrounding the heat shield assembly.

In some embodiments, the carrier includes a base and a mount post that extends outwardly away from the base. The heat-shield tile includes an outer wall configured to be exposed to the high-temperature air and an attachment feature that extends inwardly toward the base of the carrier.

In some embodiments, the mount post included in the carrier interlocks with the attachment feature included in the heat-shield tile to couple the heat-shield tile with the carrier for movement with the carrier. The carrier may further include a load flange that extends outwardly from the base and engages the outer wall of the heat-shield tile and the load flange and mount post cooperate to apply an outward force to the heat-shield tile with the load flange and an inward force to the heat-shield tile with the mount post.

In some embodiments, the mount post included in the carrier includes an inner mating surface that faces the base. The attachment feature included in the heat-shield tile may include an outer mating surface that faces the outer wall and engages the inner mating surface. The inner mating surface and the outer mating surface may be ramped to cause the mount post to urge the heat-shield tile inwardly toward the base.

In some embodiments, the carrier includes a first carrier segment and a second carrier segment. The first carrier segment may a first portion of the base and includes the first mount post and the first load flange. The second carrier segment may form a second portion of the base and includes a second mount post having a ramped mating surface and a second load flange. The first carrier segment and the second carrier segment may be coupled together in compression to cause the first mount post and the second mount post to move toward one another during assembly to cause the first mount post and the second mount post to urge the heat-shield tile toward the base.

In some embodiments, the mount post includes a hanger engaged with the attachment feature of the heat-shield tile and a fitted end that extends from the hanger and is slidably coupled with the base of the carrier.

In some embodiments, the outer wall of the heat-shield tile has a first terminal end and a second terminal end thereof, the load flange engages the outer wall such that at least one of the first terminal end and the second terminal end of the outer wall is unsupported and cantilevered away from the load flange. The outer wall may have an outer surface that is exposed to the high-temperature air and the outer surface defines an outer contour of the at least one of the airframe and the gas turbine engine.

According to another aspect of the present disclosure, a heat shield assembly includes a carrier and a heat-shield tile. The carrier includes metallic material and has a base and a load flange that extends outwardly away from the base. The heat-shield tile includes material different than the carrier and is arranged to cover the carrier to protect the carrier from high-temperature air surrounding the heat shield assembly. The heat-shield tile includes an outer wall configured to be exposed to the high-temperature air and an attachment feature that extends inwardly toward the base of the carrier. The attachment feature included in the heat-shield tile is coupled with the base to cause the load flange to engage the outer wall and apply an outward force to the outer wall.

In some embodiments, the carrier further includes a fastener that extends through the base and into the attachment feature to couple the heat-shield tile with the carrier. In some embodiments, the attachment feature extends inward away from the outer wall toward the base to cause the heat-shield tile to have a "T" shape.

In some embodiments, the carrier includes an intermediate carrier slidingly engaged with the attachment feature to couple the attachment feature with the carrier and a fastener that extends through the base of the carrier and into the intermediate carrier to couple the intermediate carrier with the base.

In some embodiments, the attachment feature extends inward away from the outer wall toward the base to cause the heat-shield tile to have an "I-beam" shape and the intermediate carrier is formed to include a first hook and a second hook that engage the attachment feature and define a slot between the first hook and the second hook in which the attachment feature is received.

In some embodiments, the outer wall of the heat-shield tile has a first terminal end and a second terminal end thereof, the load flange engages the outer wall such that at least one of the first terminal end and the second terminal end of the outer wall is unsupported and cantilevered away from the load flange.

In some embodiments, the attachment feature and the load flange cooperate to impart a positive bending moment on the outer wall of the heat-shield tile.

According to another aspect of the present disclosure, a heat shield assembly includes a carrier, a heat-shield tile, and an intermediate carrier. The carrier is made from metallic material and includes a base, a first load flange that extends away from the base, and a second load flange that extends away from the base. The first load flange may be spaced apart from the second load flange. The heat-shield tile is made from material different than the carrier and is arranged to cover the carrier to protect the carrier from high-temperature air surrounding the heat shield assembly. The heat-shield tile includes an outer wall configured to be exposed to the high-temperature air and an attachment feature that extends inwardly toward the base of the carrier. The attachment feature includes a first attachment flange that extends away from the outer wall toward the base and a second attachment flange that extends away from the outer wall toward the base. The first attachment flange is spaced apart from the second attachment flange. The intermediate carrier is configured to couple the heat-shield tile with the carrier. The intermediate carrier includes a body located between the first attachment flange and the second attachment flange and a pin that extends into the first attachment flange, through the body, and into the second attachment flange to couple the intermediate carrier with the heat-shield tile. The intermediate carrier is coupled with the carrier for movement with the carrier to couple the heat-shield tile with the carrier.

In some embodiments, the intermediate carrier further includes a plurality of hollow arms that extend outward away from the body. At least two of the plurality of arms may be aligned with one another on opposite sides of the body and receive a single pin that extends though the at least two arms and is coupled to the attachment feature of the heat-shield tile.

In some embodiments, the body is formed to include at least one aperture that opens toward the carrier and is sized to receive a fastener and the fastener is configured to load the heat shield tile against the load flange.

In some embodiments, the intermediate carrier further includes a sinter strip that slidingly engages with the body and the base of the carrier and is configured to shrink when sintered to urge the body toward the base and load the heat-shield tile on the carrier. The sinter strip includes a material that is different from both the carrier and the heat-shield tile.

These and other features of the present disclosure will become more apparent from the following description of the illustrative embodiments.

BRIEF DESCRIPTION OF THE DRAWINGS

FIG. 20 is a perspective view of an eighth embodiment of a heat shield assembly including a carrier made from metallic material and a heat-shield tile including a mechanical attachment feature including a first attachment flange and a second attachment flange that each engage with an intermediate carrier that is retained to the carrier by a sinter strip as shown in FIG. 21 to retain load the intermediate carrier and the heat-shield tile to the carrier;

FIG. 21 is a perspective view of the heat shield assembly from FIG. 20 with the carrier removed to show the intermediate carrier coupled to both the first attachment flange and the second attachment flange and the sinter strip coupled to the intermediate carrier; and FIG. 22 is a sectional view of the heat shield assembly taken along line 22-22 in FIG. 20 showing that the carrier includes a base and a pair of load flanges that extend outward from the base and into contact with the heat-shield tile so that each load flange applies an outward force on the heat-shield tile while the sinter strip is configured to pull the intermediate carrier and the attachment feature toward the base after being sintered to apply an inward force on the heat-shield tile.

DETAILED DESCRIPTION

Figure 1A:
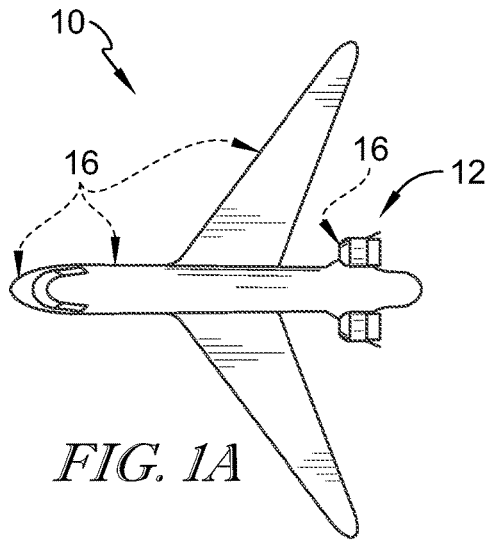
FIG. 1A is a perspective view of an aircraft including an airframe and at least one gas turbine engine, in accordance with the present disclosure, at least portions of the airframe and the gas turbine engine include a plurality of heat shield assemblies to insulate the aircraft from high temperatures during operation.

For the purposes of promoting an understanding of the principles of the disclosure, reference will now be made to a number of illustrative embodiments illustrated in the drawings and specific language will be used to describe the same.

Figure 1B:
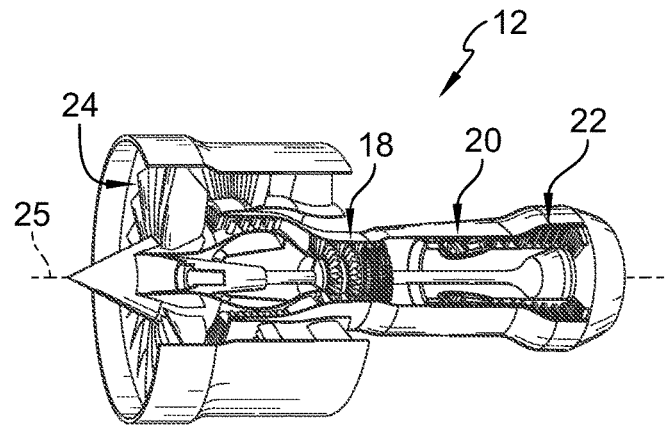
FIG. 1B is a perspective view of the gas turbine engine from FIG. 1A with portions cut away to show interior portions of the gas turbine engine that may be covered with one or more heat shield assemblies.

An aircraft 10, in accordance with the present disclosure, includes at least one gas turbine engine 12 is shown in FIGS. 1A and 1B. The aircraft 10 and the gas turbine engine 12 each make up portions of an overall airframe 16. The airframe 16 of the aircraft 10 and the gas turbine engines 12 may be covered entirely or partially by one or more heat shield assemblies 100, 200, 300, 400, 500, 600, 700, and/or 800 to insulate against high temperature air. In other embodiments, the aircraft 10 may use one or more of the heat shield assemblies 100-800 as coverings, but not include a gas turbine engine 12 such as, for example, if the aircraft 10 is a space craft or is ram jet powered.

The gas turbine engine 12 includes a compressor 18, a combustor 20, and a turbine 22. The compressor 18 is configured to pressurize air and delivers the pressurized air to the combustor 20 during operation. Fuel is injected into the combustor 20 and is ignited with the pressurized air to produce hot, high pressure gases which are discharged from the combustor 20 toward the turbine 22. The hot, high pressure gases drive rotation of rotating components (i.e. blades and disks) in the turbine 22 about an axis 25. In some embodiments, the gas turbine engine 12 further includes a fan 24 to provide thrust for the gas turbine engine 12.

The aircraft 10 may be configured to achieve supersonic flight using thrust provided by the gas turbine engines 12. During flight, portions of the aircraft 10 and the gas turbine engines 12 may be exposed to high temperature air which may damage the airframe 16 of the aircraft 10 or portions of the gas turbine engine 12. The heat shield assemblies 100, 200, 300, 400, 500, 600, 700, and/or 800 are configured to cover the airframe 16 to insulate the airframe 16 from the high temperature air. In some embodiments, the aircraft 10 includes a ram jet and may or may not include the gas turbine engine 12. The ram jet may use one or more of the heat shield assemblies 100-800 for covering portions exposed to high-temperature gases.

Each heat shield assembly 100, 200, 300, 400, 500, 600, 700, and 800 is illustrative embodied as a square or rectangular section that is sized to cover only a portion of the airframe 16 or gas turbine engine 12. Multiple heat shield assemblies 100, 200, 300, 400, 500, 600, 700, and 800 may be arranged adjacent to one another along the airframe 16 to cover the entire airframe or portions of the airframe 16 that are most vulnerable to the high temperature air. The heat shield assemblies 100, 200, 300, 400, 500, 600, 700, and 800 may have any shape and may have a planar or a curvilinear contour depending on the portion of the airframe 16 they are covering. Portions of the heat shield assemblies 100, 200, 300, 400, 500, 600, 700, and 800 may partially overlap one another to form ship-lapped or scaled interfaces to seal between each heat shield assembly and/or increase aerodynamics of the aircraft 10. Separate seal members (not shown) may also be included to increase sealing between each heat shield assembly 100, 200, 300, 400, 500, 600, 700, and 800.

In one example, the heat shield assemblies 100, 200, 300, 400, 500, 600, 700, and 800 are coupled to portions of the aircraft external to the gas turbine engine 12 such as leading ends of a body or wings of the aircraft 10 or an exterior surface of the gas turbine engine 12 such as the engine nacelle. In another example, the heat shield assemblies 100, 200, 300, 400, 500, 600, 700, and 800 are coupled to interior portions of the gas turbine engine 12 such as portions of the combustor 20, the turbine 22, exhaust ducting, or other hot sections of the gas turbine engine 12.

Figure 2:
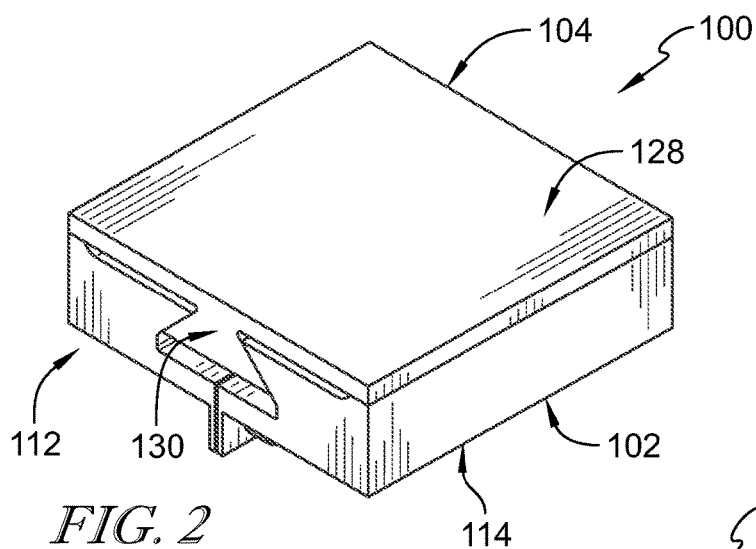
FIG. 2 is a perspective view of a first embodiment of a heat shield assembly, in accordance with the present disclosure, including a carrier made from metallic material and a heat-shield tile coupled to the carrier by a mechanical attachment feature with a dovetail shape that cooperates with portions of the carrier to load the heat-shield tile against the carrier while allowing for varying thermal expansion rates between the carrier and the heat-shield tile.
Figure 3:
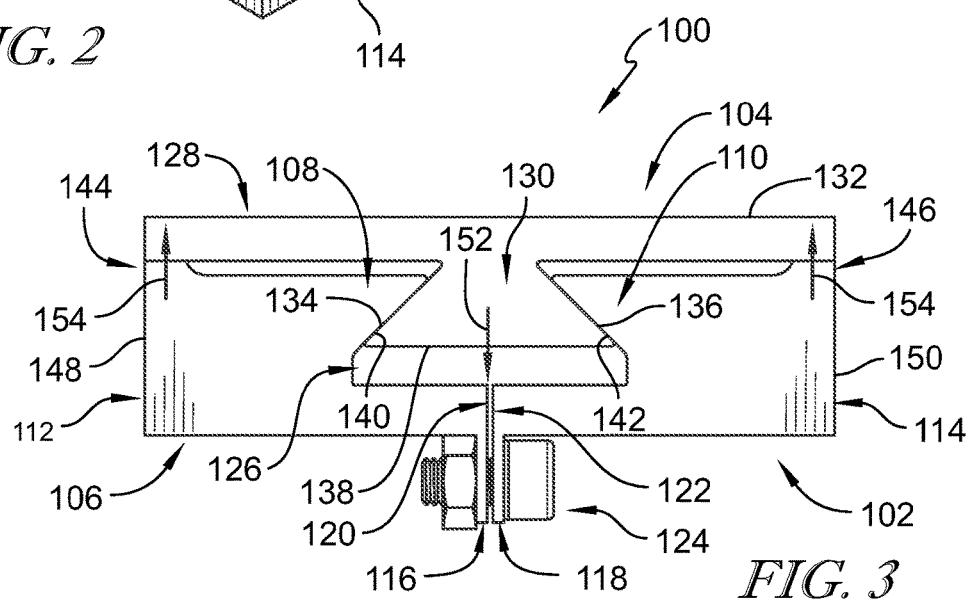
FIG. 3 is a side elevation view of the heat shield assembly from FIG. 2 showing that the carrier includes a base and a pair of load flanges that extend outward from the base and into contact with the heat-shield tile so that each load flange applies an outward force on the heat-shield tile while the attachment feature cooperates with the base to apply an inward force on the heat-shield tile.

A first embodiment of a heat shield assembly is shown in FIGS. 2 and 3. The heat shield assembly 100 includes a carrier 102 and a heat-shield tile 104. The carrier 102 may be the airframe 16 of the aircraft 10 or the gas turbine engine 12 or may be a separate component that is coupled to the airframe 16 of the aircraft 10 or the gas turbine engine 12. The carrier 102 is configured to support the heat-shield tile 104 on the airframe 16. The heat-shield tile 104 is arranged to cover the carrier 102 to insulate the carrier 102 and/or the underlying airframe 16 from high temperatures during operation of the aircraft 10 and the gas turbine engine 12.

The carrier 102 is made from metallic material and has a first coefficient of thermal expansion. The heat-shield tile 104 is made from a material different than the metallic material of the carrier 102 and has a second coefficient of thermal expansion different than the carrier 102. The metallic material forming the carrier 102 may include a nickel or titanium based metal material. The material of the heat-shield tile 104 may include ceramic matrix composites, high entropy alloys, metal matrix composites, niobium alloys, titanium alloys, and/or nickel superalloys (i.e. a single crystal).

The carrier 102 may grow at a rate different than the heat-shield tile 104 when exposed to elevated temperatures due to the different materials included in each. The carrier 102 may shrink at a rate different than the heat-shield tile 104 when the elevated temperatures are removed during or after flight. Mounting the heat-shield tile 104 to the carrier 102 by a joining or bonding process, such as welding, brazing, sintering, or soldering, may be difficult due to the material differences between the carrier 102 and the heat-shield tile 104. As such, the carrier 102 and the heat-shield tile 104 are shaped or formed such that they are mechanically coupled to one another as opposed to being joined or bonded to one another. The heat-shield tile 104 is also mounted on the carrier 102 such that binding stresses caused as a result of the deferring rates of thermal expansion between the carrier 102 and the heat-shield tile 104 are minimized.

The carrier 102 includes a base 106, a first mount post 108, and a second mount post 110 as shown in FIGS. 2 and 3. The base 106 supports the first and second mount posts 108, 110 relative to the heat-shield tile 104. The first and second mount posts 108, 110 are arranged to extend outwardly from the base 106 toward the heat-shield tile 104 and are configured to cooperate with portions of the heat-shield tile 104 to retain the carrier 102. Although the carrier 102 includes two mount posts 108, 110, it is possible, in some embodiments, to omit either of the mount posts 108, 110 and still support the heat-shield tile 104 on the carrier 102.

In the illustrative embodiment, the carrier 102 is divided into a first section 112 and a second section 114. The base 106 is also divided so as to form portions of both the first section 112 and the second section 114. The first mount post 108 is coupled to the first section 112 and the second mount post 110 is coupled to the second section 114. Each section 112, 114 includes an installation flange 116, 118 that extends away from the base 106 and each of the mount posts 108, 110. Each installation flange 116, 118 is positioned on complementary edges 120, 122 of the base 106 relative to the first and second sections 112, 114 so that they lie against or near one another when the heat shield assembly 100 is fully assembled as shown in FIG. 3. The installation flanges 116, 118 are configured to receive a fastener 124 to retain the first and second sections 112, 114 together in an installed position as show in FIG. 3. The first and second mount posts 108, 110 are spaced apart from one another in the installed position to define an attachment space 126 therebetween that captures a portion of the heat-shield tile 104.

The heat-shield tile 104 includes an outer wall 128 and an attachment feature 130 that extends away from the outer wall 128 as shown in FIGS. 2 and 3. The outer wall 128 is arranged to cover all or portions of the carrier 102 to block the carrier 102 from exposure to high temperature air impinging on an outer surface 132 of the outer wall 128. The attachment feature 130 extends away from the outer wall 128 and cooperates with the first and second mount posts 108, 110 to retain the heat-shield tile 104 to the carrier 102. The attachment feature 130 extends along an entire length of the outer wall 128 to increase distribution of loads across outer wall 128, however, the attachment feature 130 may extend only partway along the length of the outer wall 128 in some embodiments.

The attachment feature 130 has a cross section in the shape of a dovetail in the illustrative embodiment shown in FIG. 3. The dovetail shape of the attachment feature 130 is defined by a first and second outer mating surfaces 134, 136 and an inner surface 138 that interconnects the first and second outer mating surfaces 134, 136. The first and second outer mating surfaces 134, 136 extend away from the outer wall 128 and diverge away from one another as they extend toward the inner surface 138. The inner surface 138 is spaced apart from the base 106 of the carrier 102 to provide clearance to accommodate thermal growth of the heat-shield tile 104 and/or the carrier 102 to minimize binding stresses.

The first and second mount posts 108, 110 are defined partially by respective inner mating surfaces 140, 142 that cooperate with portions of the base 106 to define the attachment space 126 as shown in FIG. 3. The inner mating surfaces 140, 142 are angled or ramped relative the base 106 and match the outer mating surfaces 134, 136 of the attachment feature 130. The inner mating surfaces 140, 142 contact each respective outer mating surface 134, 136 of the attachment feature 130 when the heat shield assembly 100 is in the installed position as shown in FIG. 3. The attachment space 126 is sized such that the first and second mount posts 108, 110 engage and urge the attachment feature 130 toward the base 106 as the first and second sections 112, 114 are brought closer together by tightening the fastener 124. The first and second mount posts 108, 110 cooperate with the attachment feature 130 to load the heat-shield tile 104 against the carrier 102 by applying an inward force 152 on the attachment feature 130.

The carrier 102 may further include first and second load flanges 144, 146 that extend away from the base 106 and the mount posts 108, 110 as shown in FIG. 3. The first load flange 144 is arranged along or near a first outer edge 148 of the first section 112 of the carrier 102. The second load flange 146 is arranged along or near a second outer edge 150 of the second section 114 of the carrier 102. The first and second load flanges 144, 146 contact the outer wall 128 to support the heat-shield tile 104 relative to the carrier 102. The first and second load flanges 144, 146 maintain spacing between the outer wall 128 of the heat-shield tile 104 and portions of the first and second mount posts 108, 110.

The first and second load flanges 144, 146 are spaced apart from one another on opposite sides of the attachment feature 130 of the heat-shield tile 104 as shown in FIG. 3. The first and second load flanges 144, 146 and the first and second mount posts 108, 110 cooperate to apply an outward force 154 to the heat-shield tile 104 with each load flange 144, 146 and the inward force 152 to the heat-shield tile 104 with the mount posts 108, 110. The outward forces 154 and the inward force 152 may cause a positive bending moment to be imparted on the outer wall 128 of the heat-shield tile 104 as the heat-shield tile 104 is loaded against the carrier 102 by bring the first section 112 toward the second section 114.

Figure 4:
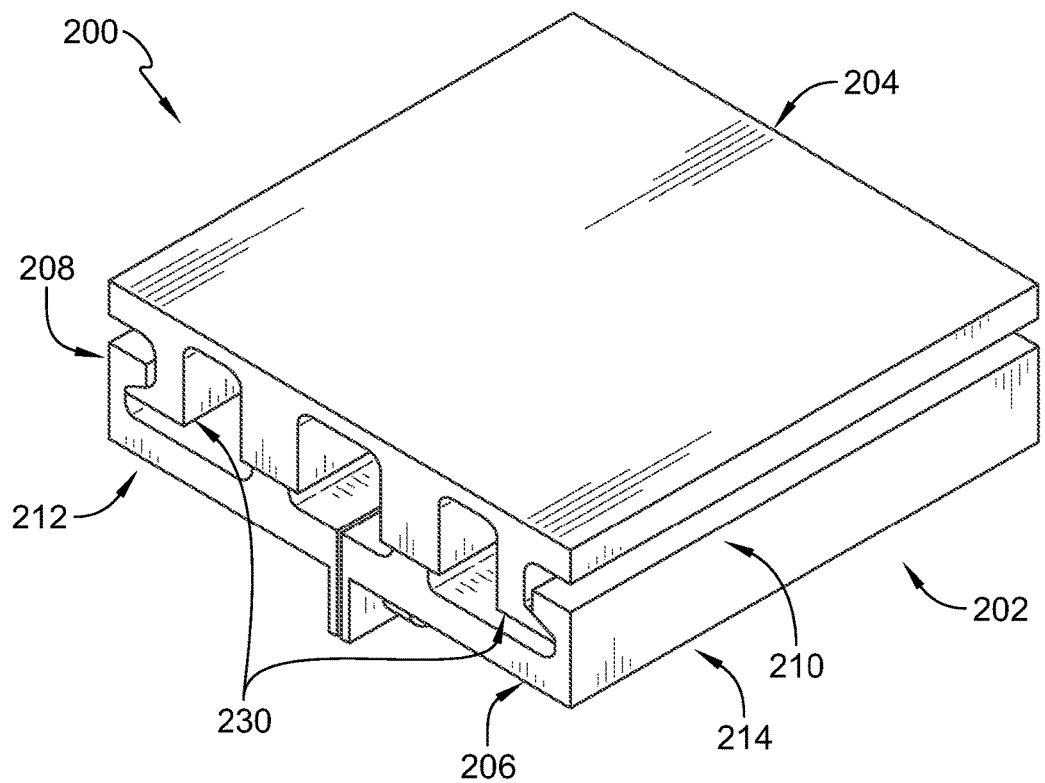
FIG. 4 is a perspective view of a second embodiment of a heat shield assembly including a carrier made from metallic material and a heat-shield tile coupled to the carrier by a mechanical attachment feature including a first mount post and a second mount post each having sloped surfaces that cooperate with portions of the carrier.
Figure 5:
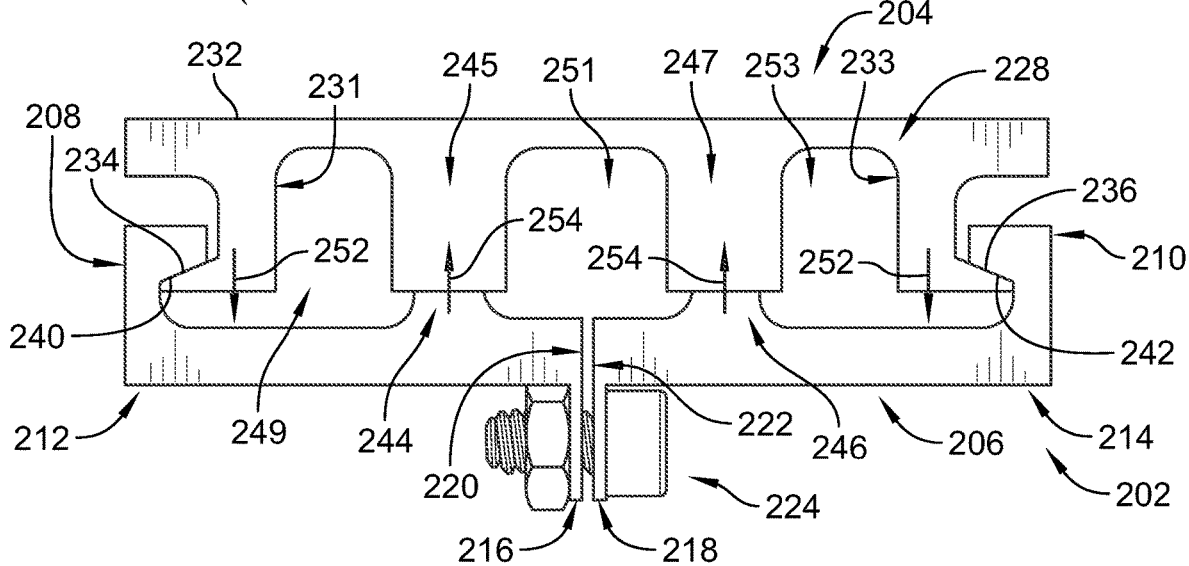
FIG. 5 is a side elevation view of the heat shield assembly from FIG. 4 showing that the carrier includes a base and a pair of load flanges that extend outward from the base and into contact with the heat-shield tile so that each load flange applies an inward force on the heat-shield tile while the first and second mount posts of the attachment feature cooperate with corresponding mount posts that extend upwardly from the base to apply an outward force on the heat-shield tile.

A second embodiment of a heat shield assembly 200 is shown in FIGS. 4 and 5. The heat shield assembly 200 is similar to heat shield assembly 100 shown in FIGS. 2 and 3 and described above. Accordingly, the disclosure of the heat shield assembly 100 is incorporated by reference for heat shield assembly 200 and similar reference numbers are used to indicate similar features between heat shield assembly 100 and heat shield assembly 200.

The heat shield assembly 200 includes a carrier 202 and a heat-shield tile 204 as shown in FIGS. 4 and 5. The carrier 202 may be the airframe 16 of the aircraft 10 or the gas turbine engine 12 or may be a separate component that is coupled to the airframe 16 of the aircraft 10 or the gas turbine engine 12. The carrier 202 is configured to support the heat-shield tile 204 on the airframe 16. The heat-shield tile 204 is arranged to cover the carrier 202 to insulate the carrier and/or the underlying airframe 16 from high temperature air during operation of the aircraft 10 and the gas turbine engine 12.

The carrier 202 includes a base 206, a first mount post 208, and a second mount post 210 as shown in FIGS. 4 and 5. The base 206 supports the first and second mount posts 208, 210 relative to the heat-shield tile 204. The first and second mount posts 208, 210 are arranged to extend outwardly from the base 206 toward the heat-shield tile 204 and are configured to cooperate with portions of the heat-shield tile 204 to retain the heat-shield tile 204 to the carrier 202.

In the illustrative embodiment, the carrier 202 is divided into a first section 212 and a second section 214. The base 206 is also divided so as to form portions of both the first section 212 and the second section 214. The first mount post 208 is coupled to the first section 212 and the second mount post 210 is coupled to the second section 214. Each section 212, 214 includes an installation flange 216, 218 that extends away from the base 206 and each of the mount posts 208, 210. Each installation flange 216, 218 is positioned on complementary edges 220, 222 of the base 206 relative to the first and second sections 212, 214 so that they lie against or near one another when the heat shield assembly 200 is fully assembled as shown in FIG. 5. The installation flanges 216, 218 are configured to receive a fastener 224 to retain the first and second sections 212, 214 together in an installed position as show in FIG. 5.

The heat-shield tile 204 includes an outer wall 228 and an attachment feature 230 that extends away from the outer wall 228 as shown in FIGS. 4 and 5. The outer wall 228 is arranged to cover all or portions of the carrier 202 to block the carrier 202 from exposure to high temperature air impinging on an outer surface 232 of the outer wall 228. The attachment feature 230 extends away from the outer wall 228 and cooperates with the first and second mount posts 208, 210 to retain the heat-shield tile 204 to the carrier 202. The attachment feature 230 extends along an entire length of the outer wall 228 to increase distribution of loads across outer wall 228, however, the attachment feature 230 may extend only partway along the length of the outer wall 228 in some embodiments.

The attachment feature 230 includes a first attachment hanger 231 coupled to the first mount post 208 and a second attachment hanger 233 coupled to the second mount post 210 as shown in FIG. 5. Each attachment hanger 231, 233 has an angled or ramped outer mating surface 234, 236. The outer mating surfaces 234, 236 extend away from the outer wall 228 and diverge away from one another as they extend toward the base 206 of the carrier 202.

The first and second mount posts 208, 210 are defined partially by respective inner mating surfaces 240, 242 as shown in FIG. 5. The inner mating surfaces 240, 242 are angled or ramped relative the base 206 and match the outer mating surfaces 234, 236 of the attachment feature 230. The inner mating surfaces 240, 242 contact each respective outer mating surface 234, 236 of the attachment feature 230 when the heat shield assembly 200 is in the installed position as shown in FIG. 5. The first and second mount posts 208, 210 engage and urge the heat-shield tile 204 toward the base 106 of the carrier 202 as the first and second sections 212, 214 are brought closer together, such as by tightening the fastener 224. The first and second mount posts 208, 210 cooperate with the first and second attachment hangers 231, 233 to load the heat-shield tile 204 against the carrier 202 by applying an inward force 152 on each attachment hanger 231, 233.

The carrier 202 may further include first and second load flanges 244, 246 that extend away from the base 206 as shown in FIG. 5. Each load flange 244, 246 is arranged between the first and second mount posts 208, 210 and the first and second attachment hangers 231, 233. The first and second load flanges 244, 246 contact the heat-shield tile 204 to support the heat-shield tile 204 relative to the carrier 202 and maintain spacing between the heat-shield tile 204 and base 206 of the carrier 202.

The heat-shield tile 204 may further include a first support flange 245 and a second support flange 247 as shown in FIG. 5. The first support flange 245 extends away from the outer wall 228 toward the first load flange 244 of the carrier 202. The second support flange 247 extends away from the outer wall 228 toward the second load flange 246 of the carrier 202. The first support flange is spaced apart from the first mount post 208 to lie between the first mount post 208 and the second support flange 247. The second support flange is spaced apart from the second mount post 210 to lie between the second mount post 210 and the second support flange 247. Cooling channels 249, 251, 253 are provided between each of the support flanges 245, 247 and the first and second mount posts 208, 210. The cooling channels 249, 251, 253 may be injected with a cooling fluid to cool portions of the heat-shield tile 204 such as outer wall 228.

The first and second load flanges 244, 246 and the first and second mount posts 208, 210 cooperate to apply an outward force 254 to the heat-shield tile 204 with each load flange 244, 246 and inward forces 152 to the heat-shield tile 104 with each mount post 208, 210 as suggested in FIG. 5. The outward forces 254 and the inward forces 252 may cause a negative bending moment to be imparted on the outer wall 228 of the heat-shield tile 204 as the heat-shield tile 204 is loaded against the carrier 202 by bringing the first section 212 toward the second section 214.

Figure 6:
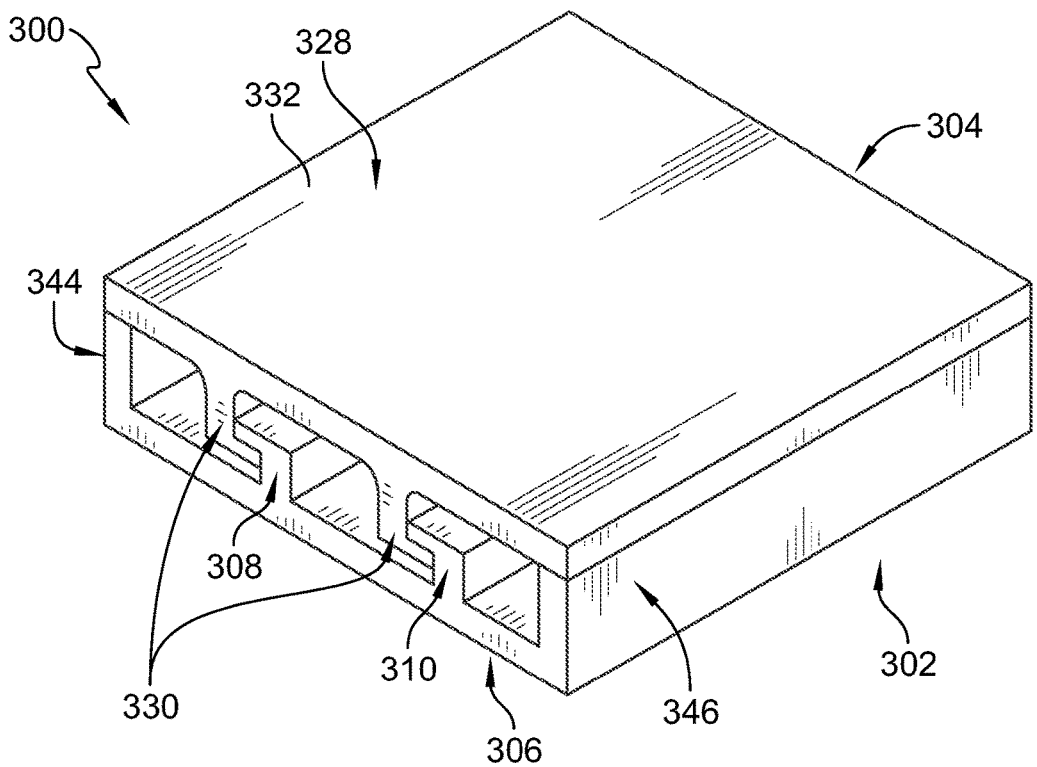
FIG. 6 is a perspective view of a third embodiment of a heat shield assembly including a carrier made from metallic material and a heat-shield tile coupled to the carrier by a mechanical attachment feature including a first hanger and a second hanger that each cooperate with a corresponding mount post of the carrier.
Figure 7:
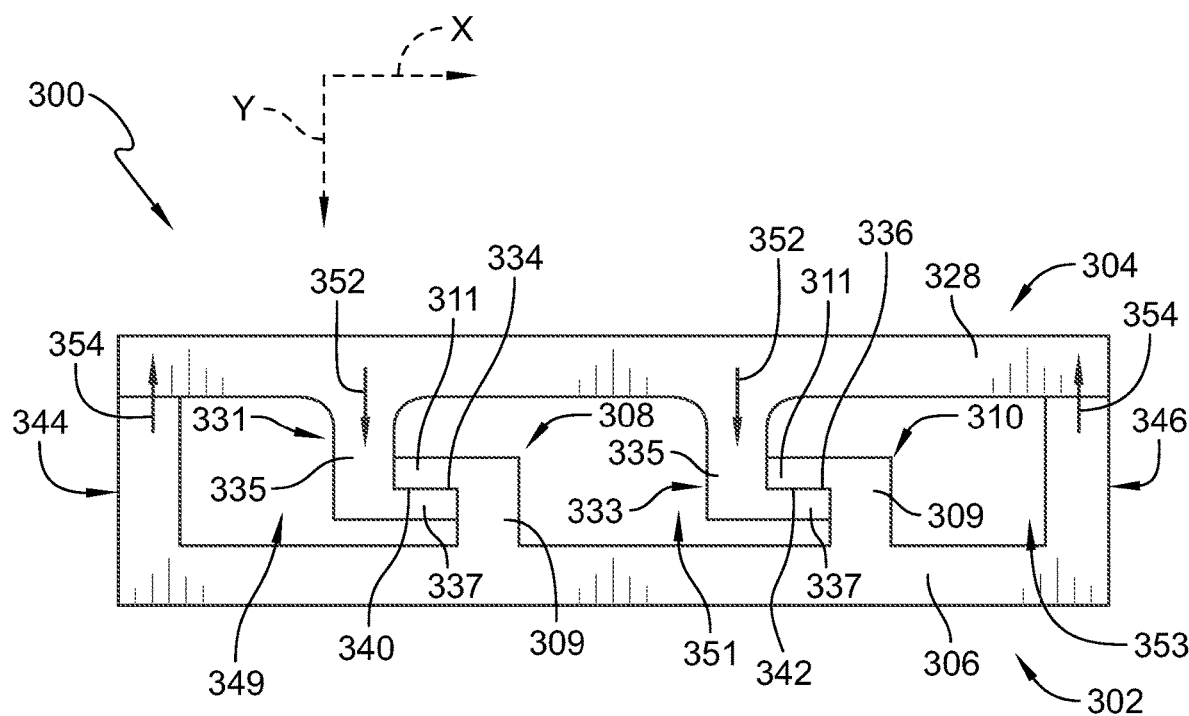
FIG. 7 is a side elevation view of the heat shield assembly from FIG. 6 showing that the carrier includes a base and a pair of load flanges that extend outward from the base and into contact with the heat-shield tile so that each load flange applies an outward force on the heat-shield tile while the first and second hangers of the attachment feature cooperate with each corresponding mount post to apply an inward force on the heat-shield tile.

A third embodiment of a heat shield assembly 300 is shown in FIGS. 6 and 7. The heat shield assembly 300 is similar to heat shield assembly 200 shown in FIGS. 4 and 5 and described above. Accordingly, the disclosure of the heat shield assembly 200 is incorporated by reference for heat shield assembly 300 and similar reference numbers are used to indicate similar features between heat shield assembly 200 and heat shield assembly 300.

The heat shield assembly 300 includes a carrier 302 and a heat-shield tile 304 as shown in FIGS. 6 and 7. The carrier 302 may be the airframe 16 of the aircraft 10 or the gas turbine engine 12 or may be a separate component that is coupled to the airframe 16 of the aircraft 10 or the gas turbine engine 12. The carrier 302 is configured to support the heat-shield tile 304 on the aircraft 10. The heat-shield tile 304 is arranged to cover the carrier 302 to insulate the carrier and/or the underlying airframe 16 from high temperature air during operation of the aircraft 10 and the gas turbine engine 12.

The carrier 302 includes a base 306, a first mount post 308, and a second mount post 310 as shown in FIGS. 6 and 7. The base 306 supports the first and second mount posts 308, 310 relative to the heat-shield tile 304. The first and second mount posts 308, 310 are arranged to extend outwardly from the base 306 toward the heat-shield tile 304 and are configured to cooperate with portions of the heat-shield tile 304 to retain the heat-shield tile 304 to the carrier 302.

The heat-shield tile 304 includes an outer wall 328 and an attachment feature 330 that extends away from the outer wall 328 as shown in FIGS. 6 and 7. The outer wall 328 is arranged to cover all or portions of the carrier 302 to block the carrier 302 from exposure to high temperature air impinging on an outer surface 332 of the outer wall 328. The attachment feature 330 extends away from the outer wall 328 toward the base 306 and cooperates with the first and second mount posts 308, 310 to retain the heat-shield tile 304 to the carrier 302. The attachment feature 330 extends along an entire length of the outer wall 328 to increase distribution of loads across outer wall 328, however, the attachment feature 330 may extend only partway along the length of the outer wall 328 in some embodiments.

The attachment feature 330 includes a first attachment hanger 331 coupled to the first mount post 308 and a second attachment hanger 333 coupled to the second mount post 310 as shown in FIG. 7. Each attachment hanger 331, 333 has a first portion 335 fixed to the outer wall 328 and arranged to extend in a first direction Y and a second portion 337 coupled to the first portion 335 and arranged to extend in a second direction X perpendicular to the first direction Y. The second portion 337 of each attachment hanger 331, 333 extends in the same direction and has an outer mating surface 334, 336 that engages with the first and second mount post 308, 310, respectively.

The first and second mount posts 308, 310 also include respective first and second portions 309, 311 that complement the first and second attachment hangers 331, 333 and are defined partially by respective inner mating surfaces 340, 242 as shown in FIG. 7. The inner mating surfaces 340, 342 are parallel with the outer mating surfaces 334, 336 to match the outer mating surfaces 334, 336 of the attachment feature 330. The inner mating surfaces 340, 342 contact each respective outer mating surface 334, 336 of the attachment feature 330 when the heat shield assembly 300 is in an installed position as shown in FIG. 7. To reach the installed position, a technician may move the heat-shield tile 304 toward the carrier 302 in the first direction Y while the second portions 337 of each attachment hanger 331, 333 are offset from the second portions 311 of the first and second mount posts 308, 310. Once the second portions 337 of each attachment hanger 331, 333 have cleared the second portions 311 of the first and second mount posts 308, 310, the heat-shield tile 304 may be translated in the second direction X so that the second portions 337, 311 overlap and interlock.

The second portion 337 of the first and second attachment hangers 331, 333 and the second portion 311 of the first and second mount posts 308, 310 may be angled or ramped in some embodiments. As the heat-shield tile 304 is moved in the second direction X, the ramped first and second mount posts 308, 310 may engage and urge the heat-shield tile 304 toward the base 306 of the carrier 302. The ramped first and second mount posts 308, 310 may cooperate with the first and second attachment hangers 331, 333 to load the heat-shield tile 304 against the carrier 302 by applying an inward force on each attachment hanger 331, 333.

The carrier 302 may further include first and second load flanges 344, 346 that extend away from the base 306 as shown in FIG. 7. Each load flange 344, 346 is spaced apart from and arranged on opposite sides of the first and second mount posts 308, 310 and the first and second attachment hangers 331, 333. The first and second load flanges 344, 346 contact the heat-shield tile 304 to support the heat-shield tile 304 relative to the carrier 302 and maintain spacing between the heat-shield tile 304 and base 306 of the carrier 302. The spacing between the heat-shield tile 304 and the base 306 may allow for growth of the heat-shield tile 304 and/or the carrier 302 when exposed to high temperature air. Cooling channels 349, 351, 353 are provided between each of the load flanges 344, 346 and the first and second mount posts 308, 310. The cooling channels 349, 351, 353 may be injected with a cooling fluid to cool portions of the heat-shield tile 304 and/or the carrier 302.

The first and second load flanges 344, 346 and the first and second mount posts 308, 310 may cooperate to apply an outward force 354 to the heat-shield tile 304 with each load flange 344, 346 and inward forces 352 to the heat-shield tile 304 with each mount post 308, 310 as suggested in FIG. 7. The outward forces 354 and the inward forces 352 may cause a positive bending moment to be imparted on the outer wall 328 of the heat-shield tile 304 as the heat-shield tile 304 is loaded against the carrier 302.

Figure 8:
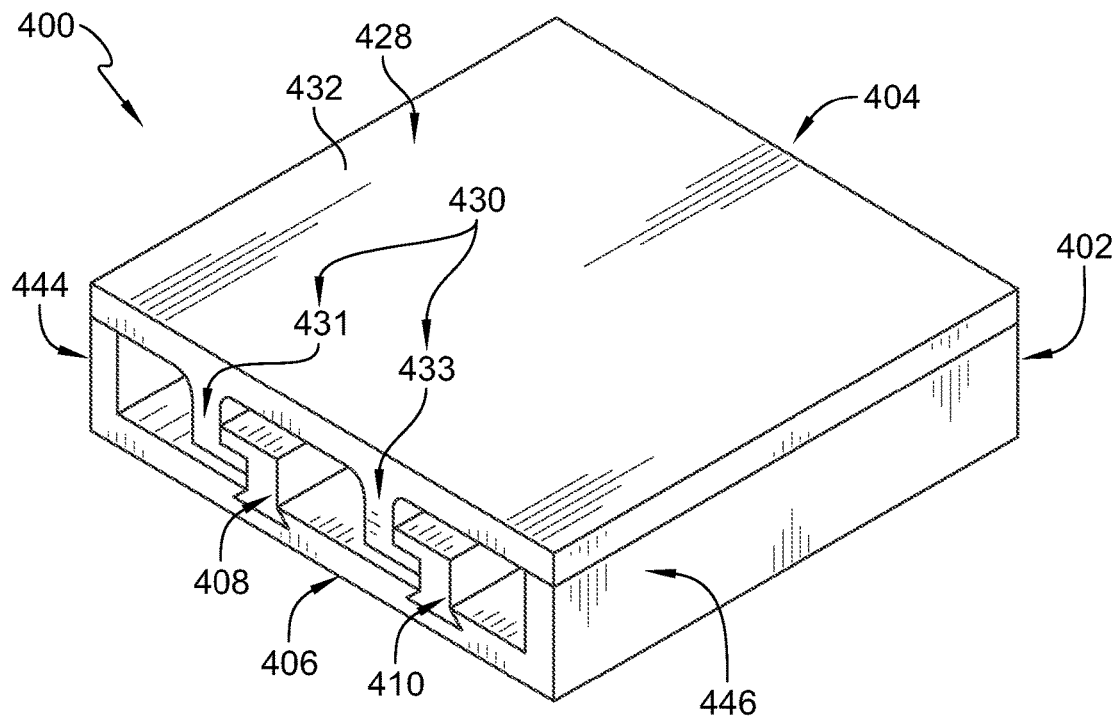
FIG. 8 is a perspective view of a fourth embodiment of a heat shield assembly including a carrier made from metallic material and a heat-shield tile coupled to the carrier by a mechanical attachment feature including a first hanger and a second hanger that each cooperate with a corresponding mount post coupled to the carrier and made from a material different than both the carrier and the heat-shield tile.
Figure 9:
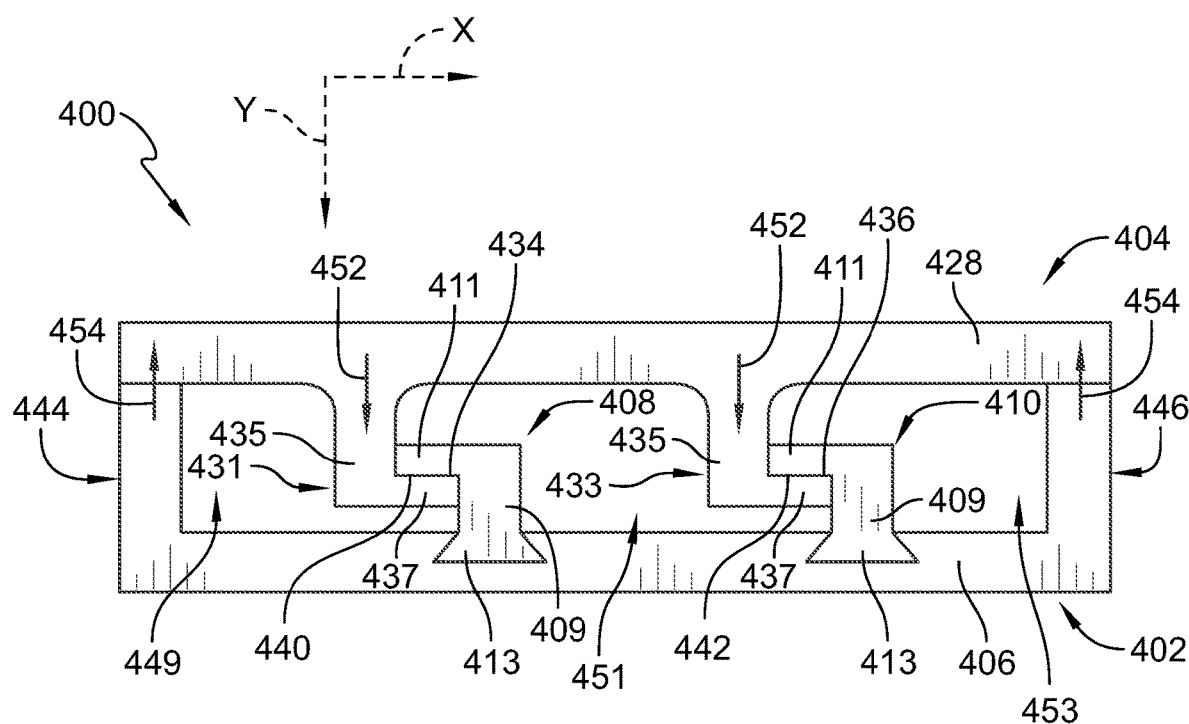
FIG. 9 is a side elevation view of the heat shield assembly from FIG. 8 showing that the carrier includes a base and a pair of load flanges that extend outward from the base and into contact with the heat-shield tile so that each load flange applies an outward force on the heat-shield tile while the first and second hangers of the attachment feature cooperate with each corresponding mount post to apply an inward force on the heat-shield tile after the mount posts have been sintered causing them the shrink and pull the heat-shield tile toward the base.

A fourth embodiment of a heat shield assembly 400 is shown in FIGS. 8 and 9. The heat shield assembly 400 is similar to heat shield assembly 300 shown in FIGS. 6 and 7 and described above. Accordingly, the disclosure of the heat shield assembly 300 is incorporated by reference for heat shield assembly 400 and similar reference numbers are used to indicate similar features between heat shield assembly 300 and heat shield assembly 400.

The heat shield assembly 400 includes a carrier 402 and a heat-shield tile 404 as shown in FIGS. 8 and 9. The carrier 402 may be the airframe 16 of the aircraft 10 or the gas turbine engine 12 or may be a separate component that is coupled to the airframe 16 of the aircraft 10 or the gas turbine engine 12. The carrier 402 is configured to support the heat-shield tile 404 on the aircraft 10. The heat-shield tile 404 is arranged to cover the carrier 402 to insulate the carrier and/or the underlying airframe 16 from high temperature air during operation of the aircraft 10 and the gas turbine engine 12.

The carrier 402 includes a base 406, a first mount post 408, and a second mount post 410 as shown in FIGS. 8 and 9. The base 406 supports the first and second mount posts 408, 410 relative to the heat-shield tile 404. The first and second mount posts 408, 410 are arranged to extend outwardly from the base 406 toward the heat-shield tile 404 and are configured to cooperate with portions of the heat-shield tile 404 to retain the heat-shield tile 404 to the carrier 402.

The heat-shield tile 404 includes an outer wall 428 and an attachment feature 430 that extends away from the outer wall 428 as shown in FIGS. 8 and 9. The outer wall 428 is arranged to cover all or portions of the carrier 402 to block the carrier 402 from exposure to high temperature air impinging on an outer surface 432 of the outer wall 428. The attachment feature 430 extends away from the outer wall 428 toward the base 406 and cooperates with the first and second mount posts 408, 410 to retain the heat-shield tile 404 to the carrier 402. The attachment feature 430 extends along an entire length of the outer wall 428 to increase distribution of loads across outer wall 428, however, the attachment feature 430 may extend only partway along the length of the outer wall 428 in some embodiments.

The attachment feature 430 includes a first attachment hanger 431 coupled to the first mount post 408 and a second attachment hanger 433 coupled to the second mount post 410 as shown in FIG. 9. Each attachment hanger 431, 433 has a first portion 435 fixed to the outer wall 428 and arranged to extend in a first direction Y and a second portion 437 coupled to the first portion 435 and arranged to extend in a second direction X perpendicular to the first direction Y. The second portion 437 of each attachment hanger 431, 433 extends in the same direction and has an outer mating surface 434, 436 that engages with the first and second mount post 408, 410, respectively.

The first and second mount posts 408, 410 also include respective first and second portions 409, 411 that complement the first and second attachment hangers 431, 433 and are defined partially by respective inner mating surfaces 440, 442 as shown in FIG. 9. The inner mating surfaces 440, 442 are parallel with the outer mating surfaces 434, 436 to match the outer mating surfaces 434, 436 of the attachment feature 430. The inner mating surfaces 440, 442 contact each respective outer mating surface 434, 436 of the attachment feature 430 when the heat shield assembly 400 is in an installed position as shown in FIG. 9.

To reach the installed position, a technician may move the heat-shield tile 404 toward the carrier 402 in the first direction Y while the second portions 437 of each attachment hanger 431, 433 are offset from the second portions 411 of the first and second mount posts 408, 410. Once the second portions 437 of each attachment hanger 431, 433 have cleared the second portions 411 of the first and second mount posts 408, 410, the heat-shield tile 404 may be translated in the second direction X so that the second portions 437, 411 overlap and interlock.

Each mount post 408, 410 is made from a material that is different from both the heat-shield tile 404 and the carrier 402. The material forming the first and second mount posts 408, 410 is configured to shrink when sintered to urge the heat-shield tile 404 toward the base 406 of the carrier 402. The first and second mount posts 408, 410 cooperate with the first and second attachment hangers 431, 433 to provide a sinter lock that loads the heat-shield tile 404 against the carrier 402 when the mount posts 408, 410 are sintered. The first and second mount posts 408, 410 are separate components from the base 406 of the carrier 402 and include dovetail-shaped roots 413 that are embedded in the base 406 of the carrier 402 to retain each mount post 408, 410 to the base 406.

The carrier 402 may further include first and second load flanges 444, 446 that extend away from the base 406 as shown in FIG. 9. Each load flange 444, 446 is spaced apart from and arranged on opposites sides of the first and second mount posts 408, 410 and the first and second attachment hangers 431, 433. The first and second load flanges 444, 446 contact the heat-shield tile 404 to support the heat-shield tile 404 relative to the carrier 402 and maintain spacing between the heat-shield tile 404 and base 406 of the carrier 402. The spacing between the heat-shield tile 404 and the base 406 may allow for growth of the heat-shield tile 404 and/or the carrier 402 when exposed to high temperature air. Cooling channels 449, 451, 453 are provided between each of the load flanges 444, 446 and the first and second mount posts 408, 410. The cooling channels 449, 451, 453 may be injected with a cooling fluid to cool portions of the heat-shield tile 404 and/or the carrier 402.

The first and second load flanges 444, 446 and the first and second mount posts 408, 410 may cooperate to apply an outward force 454 to the heat-shield tile 404 with each load flange 444, 446 and an inward force 452 to the heat-shield tile 404 with each mount post 408, 410 as suggested in FIG. 9. The outward forces 454 and the inward forces 452 may cause a positive bending moment to be imparted on the outer wall 428 of the heat-shield tile 404 as the heat-shield tile 404 is loaded against the carrier 402.

Figure 10:
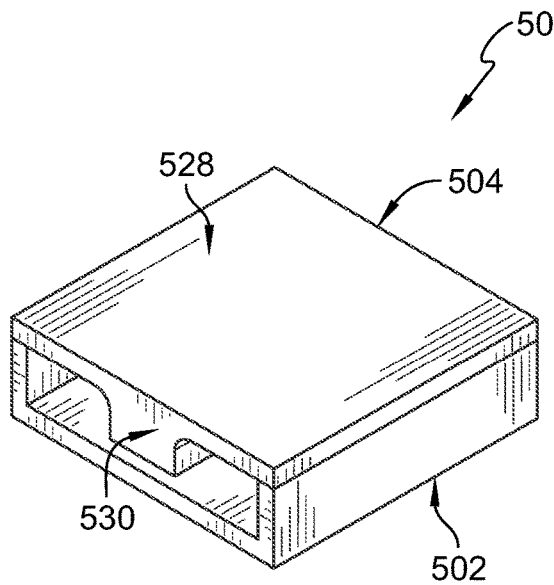
FIG. 10 is a perspective view of a fifth embodiment of a heat shield assembly including a carrier made from metallic material and a heat-shield tile coupled to the carrier by a mechanical attachment feature that is formed to include a plurality of apertures that each receive a fastener as shown in FIG. 11 to couple the heat-shield tile to the carrier.
Figure 11:
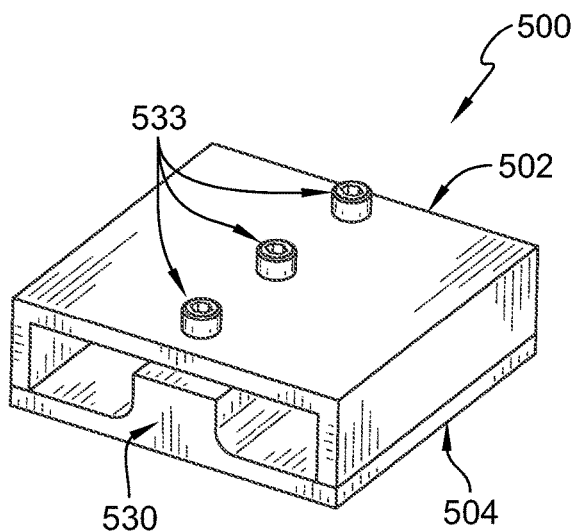
FIG. 11 is a perspective view of an underside of the heat shield assembly from FIG. 10 to show each of the fasteners extending through the carrier toward the attachment feature of the heat-shield tile to couple the heat-shield tile to the carrier.
Figure 12:
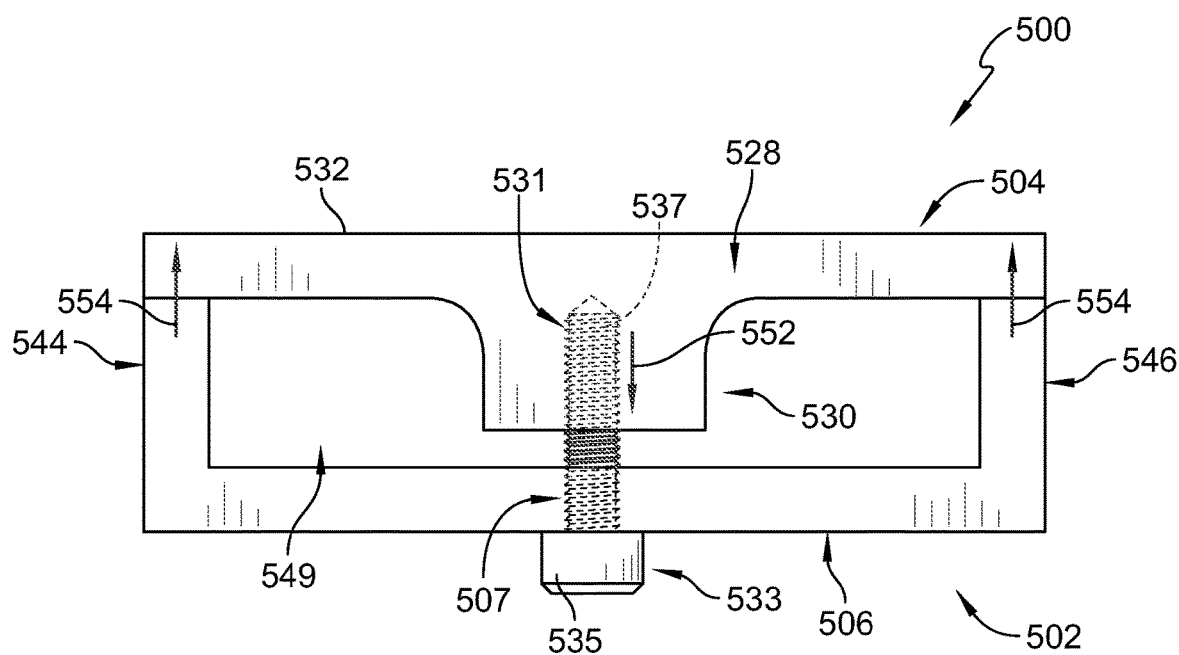
FIG. 12 is a sectional view of the heat shield assembly taken along line 12-12 in FIG. 10 showing that the carrier includes a base and a pair of load flanges that extend outward from the base and into contact with the heat-shield tile so that each load flange applies an outward force on the heat-shield tile while the fastener is configured to pull the attachment feature toward the base when tightened to apply an inward force on the heat-shield tile.

A fifth embodiment of a heat shield assembly 500 is shown in FIGS. 10-12. The heat shield assembly 500 is similar to heat shield assembly 100 shown in FIGS. 2 and 3 and described above. Accordingly, the disclosure of the heat shield assembly 100 is incorporated by reference for heat shield assembly 500 and similar reference numbers are used to indicate similar features between heat shield assembly 100 and heat shield assembly 500.

The heat shield assembly 500 includes a carrier 502 and a heat-shield tile 504 as shown in FIGS. 10-12. The carrier 502 may be the airframe 16 of the aircraft 10 or the gas turbine engine 12 or may be a separate component that is coupled to the airframe 16 of the aircraft 10 or the gas turbine engine 12. The carrier 502 is configured to support the heat-shield tile 504 on the aircraft 10. The heat-shield tile 504 is arranged to cover the carrier 502 to insulate the carrier and/or the underlying airframe 16 from high temperature air during operation of the aircraft 10 and the gas turbine engine 12.

The carrier 502 includes a base 506, a first load flange 544, and a second load flange 546 as shown in FIGS. 10-12. The base 506 supports the first and second load flanges 544, 546 relative to the heat-shield tile 504. The first and second load flanges 544, 546 are arranged to extend outwardly from the base 506 toward the heat-shield tile 504 and are configured to engage with portions of the heat-shield tile 504 to support the heat-shield tile 504 on the carrier 502.

The heat-shield tile 504 includes an outer wall 528 and an attachment feature 530 that extends away from the outer wall 528 as shown in FIGS. 10-12. The outer wall 528 is arranged to cover all or portions of the carrier 502 to block the carrier 502 from exposure to high temperature air impinging on an outer surface 532 of the outer wall 528. The attachment feature 530 extends away from the outer wall 528 toward the base 506 and cooperates with the carrier 502 to retain the heat-shield tile 504 to the carrier 502. The attachment feature 530 extends along an entire length of the outer wall 528, however, the attachment feature 530 may extend only partway along the length of the outer wall 528 in some embodiments.

The attachment feature 530 has a thickness that is greater than a thickness of the outer wall 528 and is located in a central region of the outer wall 528 as shown in FIG. 12. The attachment feature 530 is formed to include one or more apertures 531 that open toward the base 506 of the carrier 502. Each aperture 531 is sized to receive a corresponding fastener 533 included in the carrier 502 to couple the heat-shield tile 504 to the carrier 502.

Each of the fasteners 533 includes a head 535 and a shaft 537 as shown in FIG. 12. Each shaft 537 is arranged to extend through an aperture 507 formed in the carrier 502 and threadingly engages with the attachment feature 530 to urge the heat-shield tile 504 toward the base 506 of the carrier 502 when tightened. The head 535 is arranged on an opposite side of the base 506 of the carrier 502 from the attachment feature 530 and loads the heat-shield tile 504 against the carrier 502 when the fastener is tightened. In some embodiments, the fastener 533 may be permanently coupled to the attachment feature 530 in the form of a stud that extends through the aperture 507 in the base 506 and receives a nut (not shown).

Each load flange 544, 546 is spaced apart from and arranged on opposite sides from the attachment feature 530 as shown in FIG. 12. The first and second load flanges 544, 546 contact the heat-shield tile 504 to support the heat-shield tile 504 relative to the carrier 502 and maintain spacing between the heat-shield tile 504 and base 506 of the carrier 502. The spacing between the heat-shield tile 504 and the base 506 may allow for growth of the heat-shield tile 504 and/or the carrier 502 when exposed to high temperature air. The area between the first and second load flanges 544, 546 provides a cooling channel 549. The cooling channel 549 may be injected with a cooling fluid to cool portions of the heat-shield tile 504 and/or the carrier 502.

The first and second load flanges 544, 546 and the fastener 533 may cooperate to apply an outward force 554 to the heat-shield tile 504 with each load flange 544, 546 and an inward force 552 to the heat-shield tile 504 with the attachment feature 530 as suggested in FIG. 12. The outward forces 554 and the inward forces 552 may cause a positive bending moment to be imparted on the outer wall 528 of the heat-shield tile 504 as the heat-shield tile 504 is loaded against the carrier 502.

Figure 13:
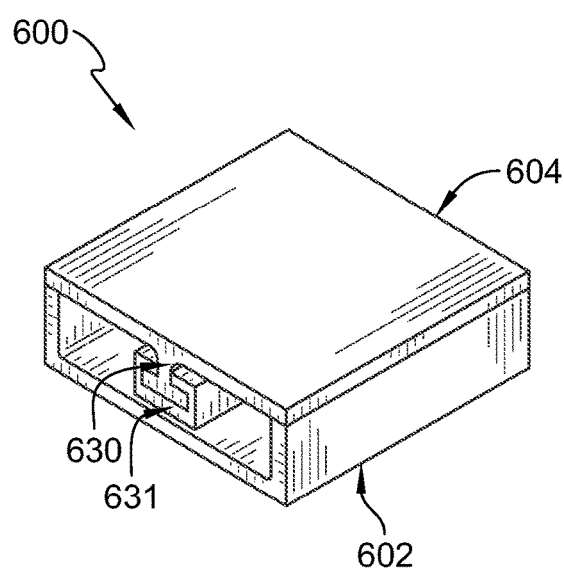
FIG. 13 is a perspective view of a sixth embodiment of a heat shield assembly including a carrier made from metallic material and a heat-shield tile including a mechanical attachment feature in the form of a guide rail that slidlingly engages with an intermediate carrier that is retained to the carrier by a fastener as shown in FIG. 11 to couple the heat-shield tile to the carrier.
Figure 14:
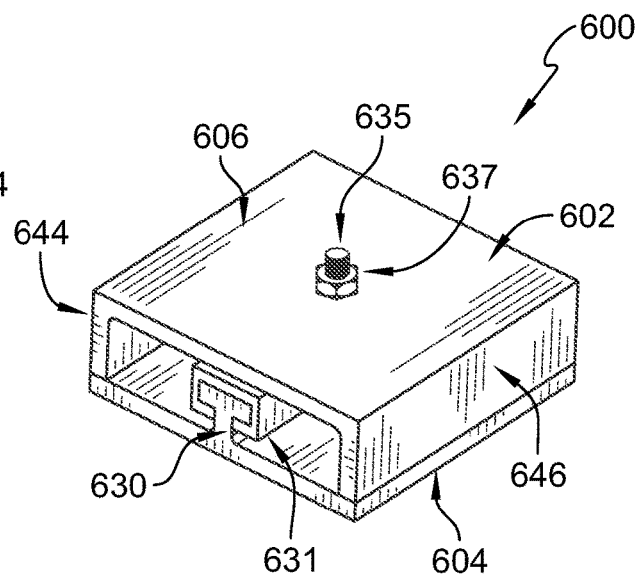
FIG. 14 is a perspective view of an underside of the heat shield assembly from FIG. 13 to show the fasteners extending through the carrier toward the intermediate carrier.
Figure 15:
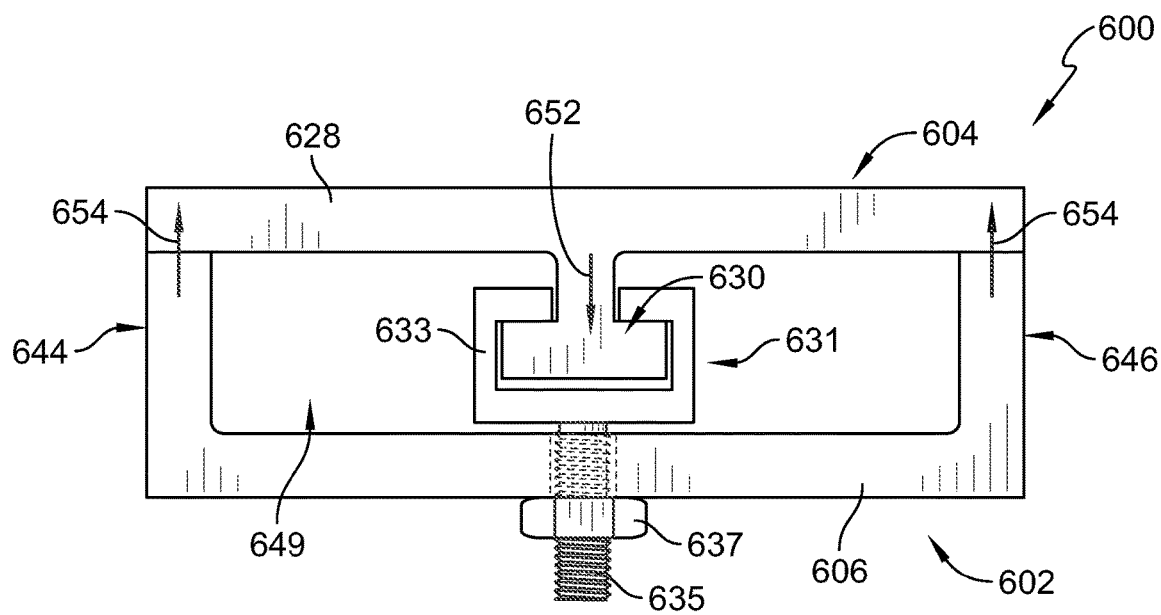
FIG. 15 is a sectional view of the heat shield assembly taken along line 15-15 in FIG. 13 showing that the carrier includes a base and a pair of load flanges that extend outward from the base and into contact with the heat-shield tile so that each load flange applies an outward force on the heat-shield tile while the fastener is configured to pull the intermediate carrier and the attachment feature toward the base when tightened to apply an inward force on the heat-shield tile.

A sixth embodiment of a heat shield assembly 600 is shown in FIGS. 13-15. The heat shield assembly 600 is similar to heat shield assembly 500 shown in FIGS. 10-12 and described above. Accordingly, the disclosure of the heat shield assembly 500 is incorporated by reference for heat shield assembly 600 and similar reference numbers are used to indicate similar features between heat shield assembly 500 and heat shield assembly 600.

The heat shield assembly 600 includes a carrier 602 and a heat-shield tile 604 as shown in FIGS. 13-15. The carrier 602 may be the airframe 16 of the aircraft 10 or the gas turbine engine 12 or may be a separate component that is coupled to the airframe 16 of the aircraft 10 or the gas turbine engine 12. The carrier 602 is configured to support the heat-shield tile 604 on the aircraft 10. The heat-shield tile 604 is arranged to cover the carrier 602 to insulate the carrier and/or the underlying airframe 16 from high temperature air during operation of the aircraft 10 and the gas turbine engine 12.

The carrier 602 includes a base 606, a first load flange 644, and a second load flange 646 as shown in FIGS. 13-15. The base 606 supports the first and second load flanges 644, 646 relative to the heat-shield tile 604. The first and second load flanges 644, 646 are arranged to extend outwardly from the base 606 toward the heat-shield tile 604 and are configured to engage with portions of the heat-shield tile 604 to support the heat-shield tile 604 on the carrier 602.

The heat-shield tile 604 includes an outer wall 628 and an attachment feature 630 that extends away from the outer wall 628 as shown in FIGS. 13-15. The outer wall 628 is arranged to cover all or portions of the carrier 602 to block the carrier 602 from exposure to high temperature air impinging on an outer surface 632 of the outer wall 628. The attachment feature 630 extends away from the outer wall 628 toward the base 606 and cooperates with the carrier 602 to retain the heat-shield tile 604 to the carrier 602. The attachment feature 630 extends along an entire length of the outer wall 628, however, the attachment feature 630 may extend only partway along the length of the outer wall 628 in some embodiments. The attachment feature 630 has a T-shaped cross section and is located in a central region of the outer wall 628 as shown in FIG. 15. The outer wall 628 and the attachment feature 630 have an I-beam cross section.

The carrier 602 further includes an intermediate carrier 631 that engages with the attachment feature 630 of the heat-shield tile 604 as shown in FIG. 15. The intermediate carrier 631 includes a cage 633, a stud 635, and a retainer 637. The cage 633 is sized to grip the attachment feature 630. The cage 633 is sized to slide onto the attachment feature 630 prior to the heat-shield tile being coupled with the carrier 602. The stud 635 extends outward from the cage 633 and is sized to extend through an aperture 607 in the base 606. The retainer 637 threadingly engages with the stud 635 on an opposite side of the base 606 from the cage 633 to retain the intermediate carrier 631 to the base 606. The intermediate carrier 631 is configured to urge the heat-shield tile 604 toward the base 606 of the carrier 602 when the retainer 637 is tightened to load the heat-shield tile 604 against the carrier 602.

Each load flange 644, 646 is spaced apart from and arranged on opposite sides from the attachment feature 630 as shown in FIG. 15. The first and second load flanges 644, 646 contact the heat-shield tile 604 to support the heat-shield tile 604 relative to the carrier 602 and maintain spacing between the heat-shield tile 604 and base 606 of the carrier 602. The spacing between the heat-shield tile 604 and the base 606 may allow for growth of the heat-shield tile 604 and/or the carrier 602 when exposed to high temperature air. The area between the first and second load flanges 644, 646 provides a cooling channel 649. The cooling channel 649 may be injected with a cooling fluid to cool portions of the heat-shield tile 604 and/or the carrier 602.

The first and second load flanges 644, 646 and the intermediate carrier 631 may cooperate to apply an outward force 654 to the heat-shield tile 604 with each load flange 644, 646 and an inward force 652 to the heat-shield tile 604 with the attachment feature 630 as suggested in FIG. 15. The outward forces 654 and the inward force 652 may cause a positive bending moment to be imparted on the outer wall 628 of the heat-shield tile 604 as the heat-shield tile 604 is loaded against the carrier 602.

A seventh embodiment of a heat shield assembly 700 is shown in FIGS. 16-19. The heat shield assembly 700 is similar to heat shield assembly 600 shown in FIGS. 13-15 and described above. Accordingly, the disclosure of the heat shield assembly 600 is incorporated by reference for heat shield assembly 700 and similar reference numbers are used to indicate similar features between heat shield assembly 600 and heat shield assembly 700.

The heat shield assembly 700 includes a carrier 702, a heat-shield tile 704, and an intermediate carrier 731 as shown in FIGS. 16-19. The carrier 702 may be the airframe 16 of the aircraft 10 or the gas turbine engine 12 or may be a separate component that is coupled to the airframe 16 of the aircraft 10 or the gas turbine engine 12. The carrier 702 is configured to support the heat-shield tile 704 and the intermediate carrier 731 on the aircraft 10. The heat-shield tile 704 is arranged to cover the carrier 702 to insulate the carrier and/or the underlying airframe 16 from high temperature air during operation of the aircraft 10 and the gas turbine engine 12.

Figure 16:
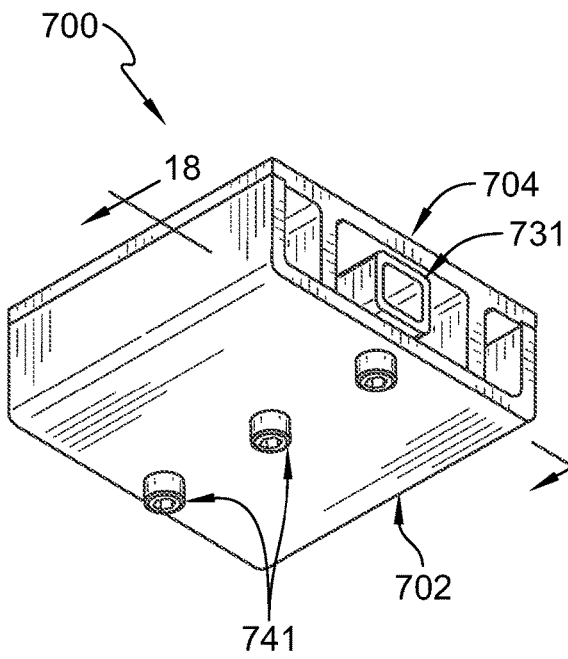
FIG. 16 is a perspective view of a seventh embodiment of a heat shield assembly including a carrier made from metallic material and a heat-shield tile including a mechanical attachment feature a first attachment flange and a second attachment flange that each engage with an intermediate carrier that is retained to the carrier by a plurality of fasteners to couple the heat-shield tile to the carrier.
Figure 18:
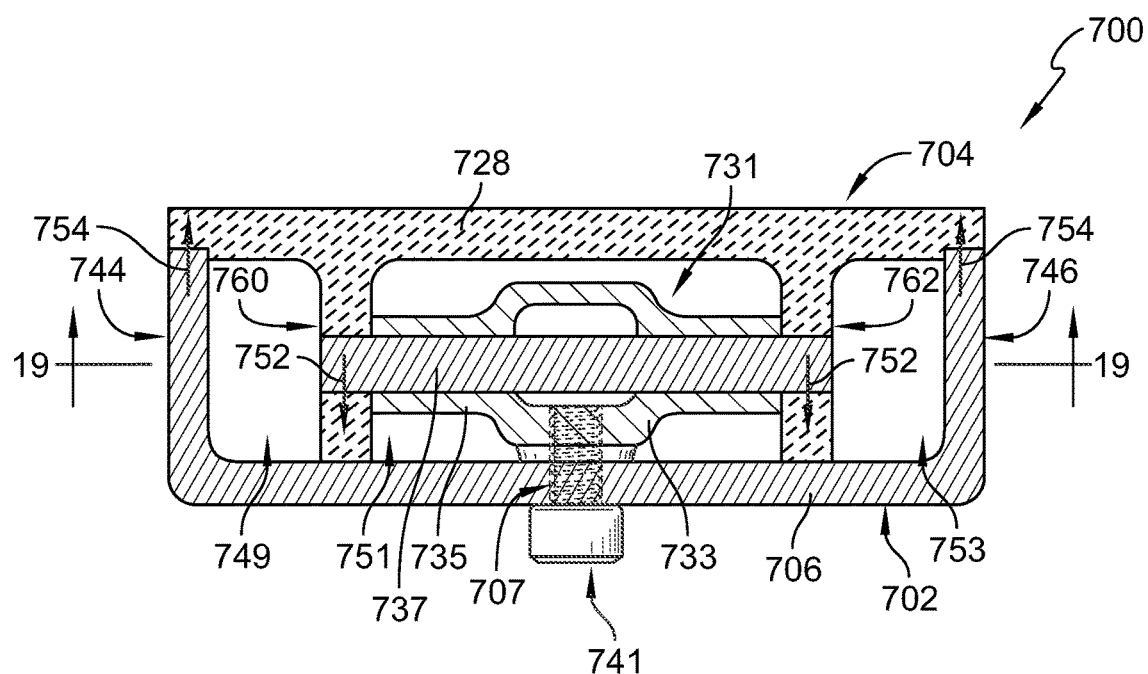
FIG. 18 is a sectional view of the heat shield assembly taken along line 18-18 in FIG. 16 showing that the carrier includes a base and a pair of load flanges that extend outward from the base and into contact with the heat-shield tile so that each load flange applies an outward force on the heat-shield tile while the fastener is configured to pull the intermediate carrier and the attachment feature toward the base when tightened to apply an inward force on the heat-shield tile.
Figure 19:
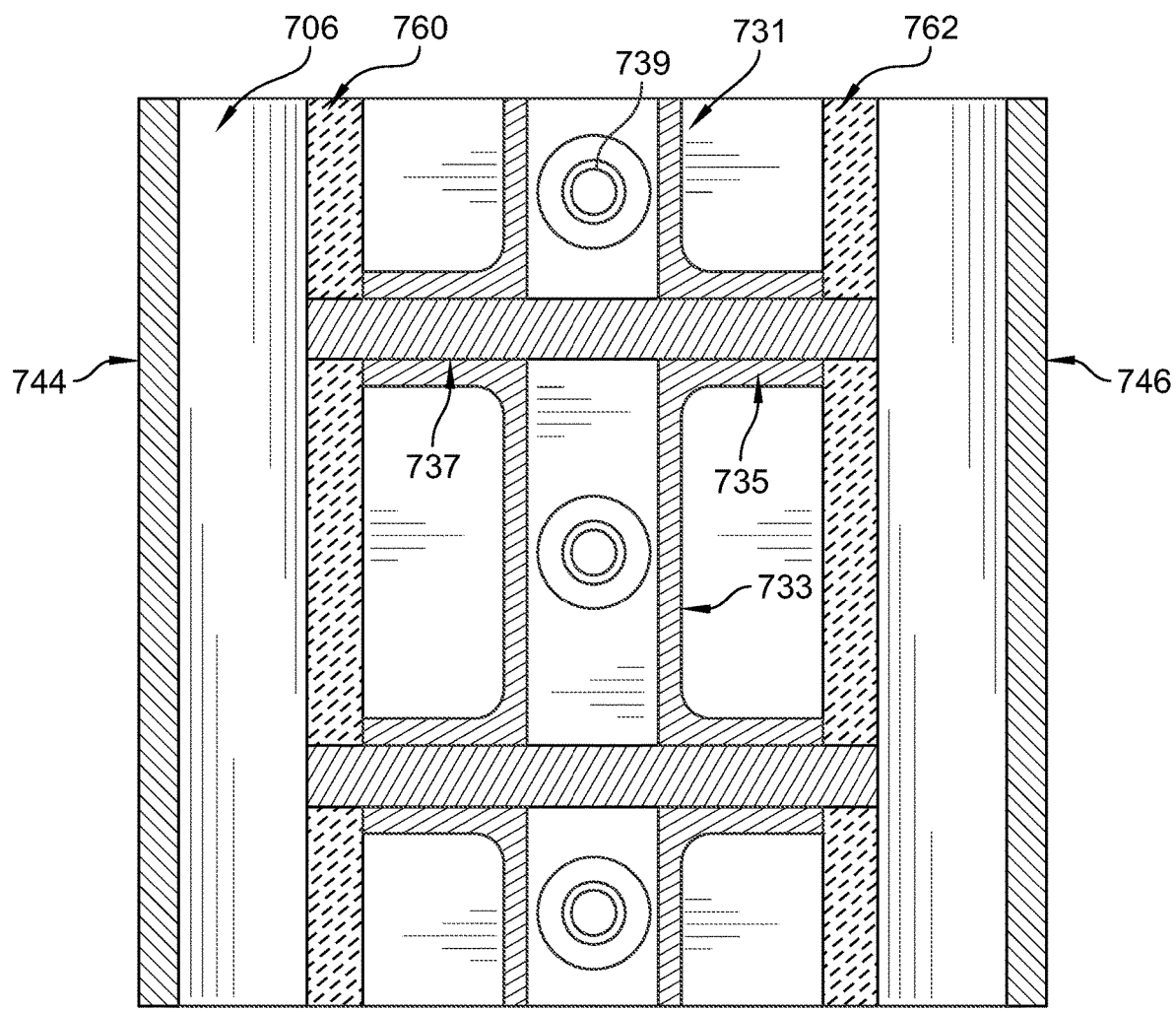
FIG. 19 is a sectional view taken along line 19-19 in FIG. 18 showing that the intermediate carrier includes body and a plurality of arms that extend outward from the body and are hollow to receive attachment pins that extend into apertures in the first and second attachment flanges to couple the intermediate carrier to the first and second attachment flanges.

The carrier 702 includes a base 706, a first load flange 744, and a second load flange 746 as shown in FIGS. 16 and 18. The base 706 supports the first and second load flanges 744, 746 relative to the heat-shield tile 704. The first and second load flanges 744, 746 are arranged to extend outwardly from the base 706 toward the heat-shield tile 704 and are configured to engage with portions of the heat-shield tile 704 to support the heat-shield tile 704 on the carrier 702.

Figure 17:
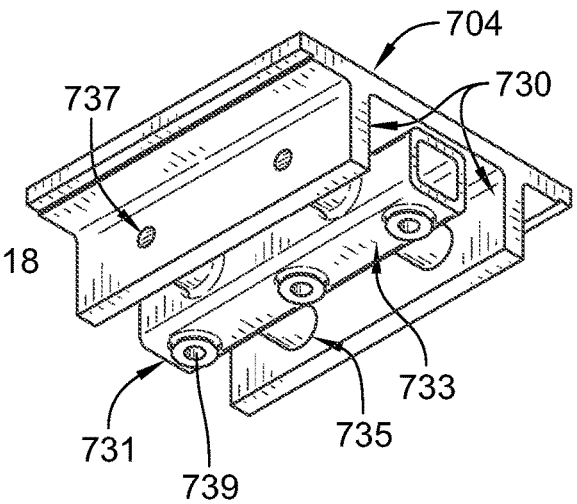
FIG. 17 is a perspective view of the heat shield assembly from FIG. 16 with the carrier removed to show the intermediate carrier coupled to both the first attachment flange and the second attachment flange.

The heat-shield tile 704 includes an outer wall 728 and an attachment feature 730 that extends away from the outer wall 728 as shown in FIGS. 17 and 18. The outer wall 728 is arranged to cover all or portions of the carrier 702 to block the carrier 702 from exposure to high temperature air impinging on an outer surface 732 of the outer wall 728. The attachment feature 730 extends away from the outer wall 728 toward the base 706 and cooperates with the intermediate carrier 731 to retain the heat-shield tile 704 to the carrier 702. The attachment feature 730 extends along an entire length of the outer wall 728, however, the attachment feature 730 may extend only partway along the length of the outer wall 728 in some embodiments.

The attachment feature 730 includes a first attachment flange 760 and a second attachment flange 762 spaced apart from the first attachment flange 760 as shown in FIG. 15. Both of the attachment flanges 760, 762 are spaced apart from and arranged between the first and second load flanges 744, 746 of the carrier 702. The first and second attachment flanges 760, 762 extend away from the outer wall 728 toward the base 706 and are coupled to the intermediate carrier 731 to mount the heat-shield tile 704 to the carrier 702.

The intermediate carrier 731 includes a body 733, a plurality of hollow arms 735, and at least one pin 737 as shown in FIGS. 17 and 18. The body 733 extends parallel with the first and second attachment flanges 760, 762 and is located between the attachment flanges 760,762. The plurality of arms 735 extend outwardly from the body toward either the first attachment flange 760 or the second attachment flange 762. Pairs of arms 735 are aligned on opposite sides of the body 733. Each pair of arms 735 receives a pin 737 that extends through the pair of arms 735 and is coupled to both the first attachment flange 760 and the second attachment flange 762. The body 733 is formed to include one or more apertures 739 that receive a fastener 741. The fasteners 741 extend through apertures 707 formed in the base 706 and into the apertures 739 where they threadingly engage the body 733 to mount the intermediate carrier 731 and the heat-shield tile 704 to the carrier 702.

Each load flange 744, 746 is spaced apart from and arranged on opposite sides from the attachment feature 730 as shown in FIG. 18. The first and second load flanges 744, 746 contact the heat-shield tile 704 to support the heat-shield tile 704 relative to the carrier 702. Spacing may be provided between the heat-shield tile 704 and the base 706 to allow for growth of the heat-shield tile 704 and/or the carrier 702 when exposed to high temperature air. The area between the first and second load flanges 744, 746 and between the first and second attachment flanges 760, 762 provides cooling channels 749, 751, 753. The cooling channels 749, 751, 753 may be injected with a cooling fluid to cool portions of the heat-shield tile 704 and/or the carrier 702.

The first and second load flanges 744, 746 and the intermediate carrier 731 may cooperate to apply an outward force 754 to the heat-shield tile 704 with each load flange 744, 746 and an inward force 752 to the heat-shield tile 704 with the attachment feature 730 as suggested in FIG. 18. The outward forces 754 and the inward forces 752 may cause a positive bending moment to be imparted on the outer wall 728 of the heat-shield tile 704 as the heat-shield tile 704 is loaded against the carrier 702 by tightening the fastener(s) 741.

An eighth embodiment of a heat shield assembly 800 is shown in FIGS. 20-22. The heat shield assembly 800 is similar to heat shield assembly 700 shown in FIGS. 16-19 and described above. Accordingly, the disclosure of the heat shield assembly 700 is incorporated by reference for heat shield assembly 800 and similar reference numbers are used to indicate similar features between heat shield assembly 700 and heat shield assembly 800.

The heat shield assembly 800 includes a carrier 802, a heat-shield tile 804, and an intermediate carrier 831 as shown in FIGS. 20-22. The carrier 802 may be the airframe 16 of the aircraft 10 or the gas turbine engine 12 or may be a separate component that is coupled to the airframe 16 of the aircraft 10 or the gas turbine engine 12. The carrier 802 is configured to support the heat-shield tile 804 and the intermediate carrier 831 on the aircraft 10. The heat-shield tile 804 is arranged to cover the carrier 802 to insulate the carrier and/or the underlying airframe 16 from high temperature air during operation of the aircraft 10 and the gas turbine engine 12.

The carrier 802 includes a base 806, a first load flange 844, and a second load flange 846 as shown in FIGS. 20 and 22. The base 806 supports the first and second load flanges 844, 846 relative to the heat-shield tile 804. The first and second load flanges 844, 846 are arranged to extend outwardly from the base 806 toward the heat-shield tile 804 and are configured to engage with portions of the heat-shield tile 804 to support the heat-shield tile 804 on the carrier 802.

The heat-shield tile 804 includes an outer wall 828 and an attachment feature 830 that extends away from the outer wall 828 as shown in FIGS. 21 and 22. The outer wall 828 is arranged to cover all or portions of the carrier 802 to block the carrier 802 from exposure to high temperature air impinging on an outer surface 832 of the outer wall 828. The attachment feature 830 extends away from the outer wall 828 toward the base 806 and cooperates with the intermediate carrier 831 to retain the heat-shield tile 804 to the carrier 802. The attachment feature 830 extends along an entire length of the outer wall 828, however, the attachment feature 830 may extend only partway along the length of the outer wall 828 in some embodiments.

The attachment feature 830 includes a first attachment flange 860 and a second attachment flange 862 spaced apart from the first attachment flange 860 as shown in FIG. 22. Both of the attachment flanges 860, 862 are spaced apart from and arranged between the first and second load flanges 844, 846 of the carrier 802. The first and second attachment flanges 860, 862 extend away from the outer wall 828 toward the base 806 and are coupled to the intermediate carrier 831 to mount the heat-shield tile 804 to the carrier 802.

The intermediate carrier 831 includes a body 833, a plurality of hollow arms 835, at least one pin 837, and a sinter strip 839 as shown in FIGS. 21 and 22. The body 833 extends parallel with the first and second attachment flanges 860, 862 and is located between the attachment flanges 860, 862. The plurality of arms 835 extend outwardly from the body 833 toward either the first attachment flange 860 or the second attachment flange 862. Pairs of arms 835 are aligned on opposite sides of the body 833. Each pair of arms 835 receives a pin 837 that extends through the pair of arms 835 and is coupled to both the first attachment flange 860 and the second attachment flange 862. The sinter strip 839 is mounted on the body 833 and is arranged to interlock with the base 806 of the carrier 802 to mount the intermediate carrier 831 and the heat-shield tile 804 to the carrier 802.

Each load flange 844, 846 is spaced apart from and arranged on opposite sides from the attachment feature 830 as shown in FIG. 22. The first and second load flanges 844, 846 contact the heat-shield tile 804 to support the heat-shield tile 804 relative to the carrier 802. Spacing may be provided between the heat-shield tile 804 and the base 806 to allow for growth of the heat-shield tile 804 and/or the carrier 802 when exposed to high temperature air. The area between the first and second load flanges 844, 846 and between the first and second attachment flanges 860, 862 provides cooling channels 849, 851, 853. The cooling channels 849, 851, 853 may be injected with a cooling fluid to cool portions of the heat-shield tile 804 and/or the carrier 802.

The first and second load flanges 844, 846 and the intermediate carrier 831 may cooperate to apply an outward force 854 to the heat-shield tile 804 with each load flange 844, 846 and an inward force 852 to the heat-shield tile 804 with the attachment feature 830 as suggested in FIG. 22. The sinter strip 839 is separate from both the body 833 and the carrier 802 and includes a material different than both the body 833 and the carrier 802. The sinter strip 839 is configured to shrink when sintered to urge the body 833 toward the base 806 and load the heat-shield tile 804 on the carrier 802 thereby causing the outward forces 854 and the inward forces 852. The outward forces 854 and the inward forces 852 may cause a positive bending moment to be imparted on the outer wall 828 of the heat-shield tile 804 as the heat-shield tile 804 is loaded against the carrier 802 after the sinter strip 839 is sintered.

Materials with high enough temperature capability to be used in cooling tiles and heat shielding may not able to be joined using traditional fusion and non-fusion processes. In order to integrate these advanced material parts into an assembly, the cooling tiles may be joined with materials that may be welded, brazed or fastened into the structure of the larger assembly. These advanced materials might include: ceramic matrix composites, high entropy alloys, metal matrix composites, niobium alloys (such as C103), titanium alloys (such as Arconic-Thor), and/or nickel superalloys (including single crystal). The material of the tile may not be comprised of the same material of the carrier due to weight reduction considerations, and therefore welding or brazing the assembly may be more difficult due to coefficient of thermal expansion (CTE) differences and other joinability concerns.

According to the present disclosure, mechanical joints may be used to hold an advanced material tile to a carrier assemblage as shown in FIGS. 2-22. One potential application may be to assemble shielding tiles on the external surface or engine nacelles, airframe skin, and other components within the engine bay and engines of a hypersonic vehicle. Some embodiments include an attachment that accommodates (to minimize stress build-up) or take advantage of differences in CTE (to both seal cooling channels and/or aspects, while also minimizing stress).

In some embodiments, a dovetail flange design that uses an angled dovetail to convert the force imparted by a mechanical fastener on the flange and apply an inward force on the tile to hold it against the carrier is used as shown in FIGS. 2 and 3. This design might feature cooling passages between the carrier and the tile, with load/sealing points on the edges of the tile. The load applied to the dovetail may be set by the spacing between the two flanges attached by the mechanical fastener.

In some embodiments, the tile design uses a plurality of hangers from both the carrier and the tile that oppose each other to hold the tile tightly to the carrier as shown in FIGS. 6 and 7. The carrier may have additional members to both seal the cooling passage and to apply a slight load to the tile, thus holding it in place. This design might use additional joining techniques in low stress areas, such as brazing, to prevent the tile from shifting and fretting damage at the contact points.

In some embodiments, the tile design might feature hangers fabricated using a material that shrinks during sintering and is attached to the carrier through a dovetail joint as shown in FIGS. 8 and 9. Upon sintering this hanger may apply a load to both the dovetail slot and the opposing hanger, holding the tile in place.

In some embodiments, the design includes a tile with a raised pad containing a plurality of threaded holes and a carrier that features thin members aligned to the edges of the tile to seal a possible cooling passage and to apply a compressive load to the backside of the tile as shown in FIGS. 10-12. The tensile load is imparted by screws threading through clearance holes in the carrier and threading into the holes on the tile. The amount of applied load can be determined by the spacing between the pad and the carrier face.

In some embodiments, the design includes a tile with an integrated t-shaped hanger, an open channel with one or more threaded studs (potentially attached via stud welding or built integrally through additive manufacturing), and an outer carrier as shown in FIGS. 13-15. The open channel may be slotted over the hanger and the threaded studs are then inserted into matching clearance holes in the carrier and nuts are then threaded on to the studs provide the force to hold the assembly together. Members of the carrier are aligned to the edge of the tile are compressed against the backside of the tile to provide load surfaces and sealing for the possible cooling passage.

In some embodiments, the design include a tile with two central pads and two hangers with sloped loading surfaces, creating three slots on the backside of the tile, and a two-piece carrier design as shown in FIGS. 3 and 4. The carrier features matched angled loading surfaces to those on the tile and will apply a downward force when the flanges on the backside of the carrier are compressed by fasteners. A compressive force may be applied from the pads on the tile to corresponding pads on the carrier. This arrangement may allow for two individual cooling passages to be sealed between the hanger and the loaded pads. Like the dovetail design embodiment, the amount of force applied can be adjusted by altering the spacing between the two flanges.

In some embodiments, the design includes a tile with two perpendicular members inset on the backside of the tile, a carriage with bosses to accept pins parallel to the backside of the tile and threaded holes to accept bolts perpendicular to the tile, and a carrier with clearance holes and two loading members aligned with the edges of the tile as shown in FIGS. 16-19. The carriage is placed in between the perpendicular members and held in place by two pins inserted through the bosses and members. These pins may be held in place though mechanical means (i.e. cotter pins, clevis pins, or bolts) or through the use of other joining techniques (i.e. interference fit, shrink fit, brazing or high temp adhesives). The carriage may be bolted on to the carrier and the outer loading members and compressed into the tile, which may have corresponding slots to enhance the sealing of the cooling passage created by the loading member of the carrier and the perpendicular member of the tile. The carriage piece may be hollow and/or feature weight saving designs such as cut-outs defined through topological optimization. In some embodiments, a sinter-lock fastener is inserted into matching grooves or the entire carriage is additively manufactured and is sinter-locked into place as shown in FIGS. 20-22.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A heat shield assembly comprising:
   a carrier comprising metallic material and including a base and a load flange that extends outwardly away from the base, and
   a heat-shield tile comprising material different than the carrier and arranged to cover the carrier to protect the carrier from high-temperature air surrounding the heat shield assembly, the heat-shield tile including an outer wall configured to be exposed to the high-temperature air and an attachment feature that extends inwardly toward the base of the carrier,
   wherein the attachment feature included in the heat-shield tile is coupled with the base to cause the load flange to engage the outer wall and apply an outward force to the outer wall, and
   wherein the attachment feature and the load flange cooperate to impart a positive bending moment on the outer wall of the heat-shield tile.

2. The heat shield assembly of claim 1, wherein the carrier further includes a fastener that extends through the base and into the attachment feature to couple the heat-shield tile with the carrier.

3. The heat shield assembly of claim 1, wherein the attachment feature extends inward away from the outer wall toward the base to cause the heat-shield tile to have a "T" shape.

4. The heat shield assembly of claim 1, wherein the carrier further includes an intermediate carrier slidingly engaged with the attachment feature to couple the attachment feature with the carrier and a fastener that extends through the base of the carrier and into the intermediate carrier to couple the intermediate carrier with the base.

5. The heat shield assembly of claim 1, wherein the attachment feature extends inward away from the outer wall toward the base to cause the heat-shield tile to have an "I-beam" shape and wherein the carrier further includes an intermediate carrier that is formed to include a first hook and a second hook that engage the attachment feature and define a slot between the first hook and the second hook in which the attachment feature is received.

6. The heat shield assembly of claim 1, wherein the outer wall of the heat-shield tile has a first terminal end and a second terminal end thereof, and at least one of the first terminal end and the second terminal end of the outer wall is unsupported and cantilevered away from the load flange.

7. The heat shield assembly of claim 1, wherein the load flange is a first load flange and is arranged to lie on a first side of the base and the carrier further includes a second load flange arranged to lie on an opposite, second side of the base from the first load flange to locate the attachment feature between the first and second load flanges.

8. The heat shield assembly of claim 7, wherein the attachment feature extends inward away from the outer wall toward the base to cause the heat-shield tile to have an "I-beam" shape and wherein the carrier further includes an intermediate carrier that is formed to include a first hook and a second hook that engage the attachment feature and define a slot between the first hook and the second hook in which the attachment feature is received.

9. The heat shield assembly of claim 8, wherein the attachment feature further includes a fastener that is fixed to the intermediate carrier and spaced apart from the first and second hooks, the fastener is arranged to extend away from the heat-shield tile and through the base of the carrier and is configured to urge the intermediate carrier toward the base to impart the positive bending moment on the outer wall of the heat-shield tile.

10. The heat shield assembly of claim 7, wherein the first and second load flanges contact the heat-shield tile to support the heat-shield tile relative to the carrier and maintain spacing between the heat-shield tile and base of the carrier that allows for growth of the at least one of the heat-shield tile and the carrier when exposed to the high-temperature air, and wherein the area between the first and second load flanges provides a cooling channel that is configured to receive cooling fluid.

11. A heat shield assembly comprising:
    a carrier including a base and a load flange that extends outwardly away from the base, and
    a heat-shield tile arranged to cover the carrier to protect the carrier from high-temperature air surrounding the heat shield assembly, the heat-shield tile including an outer wall configured to be exposed to the high-temperature air and an attachment feature that extends inwardly toward the base of the carrier,
    wherein the attachment feature included in the heat-shield tile is coupled with the base to cause the load flange to engage the outer wall and apply an outward force to the outer wall,
    wherein the carrier further includes an intermediate carrier slidingly engaged with the attachment feature to couple the attachment feature with the carrier and a fastener that extends through the base of the carrier and into the intermediate carrier to couple the intermediate carrier with the base, and
    wherein the fastener is arranged to lie along an axis that passes through the attachment feature of the heat-shield tile.

12. The heat shield assembly of claim 11, wherein the attachment feature extends inward away from the outer wall toward the base to cause the heat-shield tile to have an "I-beam" shape and the intermediate carrier includes a unitary cage having a first hook and a second hook that engage the attachment feature and define a slot between the first hook and the second hook in which the attachment feature is received.

13. The heat shield assembly of claim 11, wherein the attachment feature and the load flange cooperate to impart a positive bending moment on the outer wall of the heat-shield tile.

14. The heat shield assembly of claim 13, wherein the load flange is a first load flange and is arranged to lie on a first side of the base and the carrier further includes a second load flange arranged to lie on an opposite, second side of the base from the first load flange to locate the attachment feature between the first and second load flanges.

15. The heat shield assembly of claim 14, wherein the attachment feature extends inward away from the outer wall toward the base to cause the heat-shield tile to have an "I-beam" shape.

16. The heat shield assembly of claim 15, wherein the first and second load flanges contact the heat-shield tile to support the heat-shield tile relative to the carrier and maintain spacing between the heat-shield tile and the base of the carrier that allows for growth of the at least one of the heat-shield tile and the carrier when exposed to the high-temperature air, and wherein the area between the first and second load flanges provides a cooling channel that is configured to receive cooling fluid.

17. A heat shield assembly comprising:
  a carrier comprising metallic material and including a base and a load flange that extends outwardly away from the base, and
  a heat-shield tile comprising material different than the carrier and arranged to cover the carrier to protect the carrier from high-temperature air surrounding the heat shield assembly, the heat-shield tile including an outer wall configured to be exposed to the high-temperature air and an attachment feature that extends inwardly toward the base of the carrier,
  wherein the attachment feature included in the heat-shield tile is coupled with the base to cause the load flange to engage the outer wall and apply an outward force to the outer wall,
  wherein the carrier further includes a cage coupled to the attachment feature, a fastener fixed to the cage and configured to extend through the base of the carrier, and a nut threadingly engaged with the fastener on a side of the base opposite the cage, and
  wherein the cage includes a bottom wall fixed to the fastener, a first hook coupled to a first end of the bottom wall, and a second end coupled to an opposite second end of the bottom wall and spaced apart from the first hook to define a slot therebetween sized to receive the attachment feature.

\* \* \* \* \*